(12) United States Patent
Wu

(10) Patent No.: US 8,457,059 B2
(45) Date of Patent: Jun. 4, 2013

(54) TRANSMISSION APPARATUS, RECEPTION APPARATUS, COMMUNICATION SYSTEM AND COMMUNICATION METHOD USING ADAPTIVE HYBRID AUTOMATIC RETRANSMISSION REQUEST METHOD

(75) Inventor: Jianming Wu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 211 days.

(21) Appl. No.: 13/088,812

(22) Filed: Apr. 18, 2011

(65) Prior Publication Data
US 2011/0194518 A1 Aug. 11, 2011

Related U.S. Application Data

(63) Continuation of application No. PCT/JP2008/003032, filed on Oct. 24, 2008.

(51) Int. Cl.
*H04W 4/00* (2009.01)
(52) U.S. Cl.
USPC .......................................................... 370/329
(58) Field of Classification Search
USPC .......................................... 714/748; 370/329
See application file for complete search history.

(56) References Cited

U.S. PATENT DOCUMENTS

| | | | |
|---|---|---|---|
| 2003/0110435 A1* | 6/2003 | Wu et al. | 714/748 |
| 2010/0095183 A1* | 4/2010 | Petrovic et al. | 714/748 |
| 2011/0078529 A1 | 3/2011 | Wu et al. | |
| 2011/0119548 A1* | 5/2011 | Imamura et al. | 714/748 |

FOREIGN PATENT DOCUMENTS

| | | |
|---|---|---|
| EP | 1 865 635 | 12/2007 |
| JP | 2004-253828 | 9/2004 |
| JP | 2006-287758 | 10/2006 |
| JP | 2007-116427 | 5/2007 |
| WO | 2010/001474 | 1/2010 |

OTHER PUBLICATIONS

3GPP TR 25.848 V4.0.0 (Mar. 2001);3rd Generation Partnership Project; Technical Specification Group Radio Access Network; Physical layer aspects of UTRA High Speed Downlink Packet Access (Release 4); Dated Mar. 2001.
3GPP TR 25.814 V7.0.0 (Jun. 2006); 3rd Generation Partnership Project;Technical Specification Group Radio Access Network; Physical layer aspects for evolved Universal Terrestrial Radio Access (UTRA) (Release 7); Dated Jun. 2006.

(Continued)

*Primary Examiner* — Albert T Chou
(74) *Attorney, Agent, or Firm* — Myers Wolin, LLC

(57) ABSTRACT

A transmission apparatus includes a first encoding unit configured to generate a new packet from a new portion obtained from a block generated from information bits, to generate a retransmission packet from a retransmission portion obtained from a block generated from information bits and held for a retransmission, and to assign the new packet and the retransmission packet to a communication channel respectively, a second encoding unit configured to assign, to a communication channel, a packet obtained by mixing the new portion and the retransmission portion, a encoding method switching unit configured to switch between operations of the first and second encoding unit, so that communication channel data output from the first or second encoding unit is transmitted, and a transmission control unit configured to control the encoding method switching unit based on information indicating a communication quality of the communication channel in a reception apparatus.

18 Claims, 12 Drawing Sheets

OTHER PUBLICATIONS

Fujitsu; "Grouped and Encoded Packet based HARQ for LTE-Advanced"; 3GPP TSG-RAN1 #54BIS; Agenda Item: 11; R1-083777; Prague, Czech, Sep. 29-Oct. 3, 2008.

IEEE Std 802.16eTM-2005 and IEEE Std 802.16TM-2004/Cor1-2005 (Amendment and Corrigendum to IEEE Std 802.16-2004); IEEE Standard for Local and metropolitan area networks; Part 16: Air Interface for Fixed and Mobile Broadband Wireless Access Systems; Amendment 2: Physical and Medium Access Control Layers for Combined Fixed and Mobile Operation in Licensed Bands and Corrigendum 1; IEEE, 3 Park Avenue, New York, NY 10016-5997; Feb. 2006.

Jianming Wu et al.; 3GPP2 TSG-C Working Group 5; "Non-Complete Puncture Based Re-transmission for HARQ" C50-20011105-025; Dated Nov. 5, 2001.

Jung-Fu (Thomas) Cheng; Coding performance of hybrid ARQ schemes vol. 54, Issue 6, IEEE; dated Jun. 2006.

International Search Report issued for corresponding International Patent Application No. PCT/JP2008/003032, mailed Dec. 16, 2008.

* cited by examiner

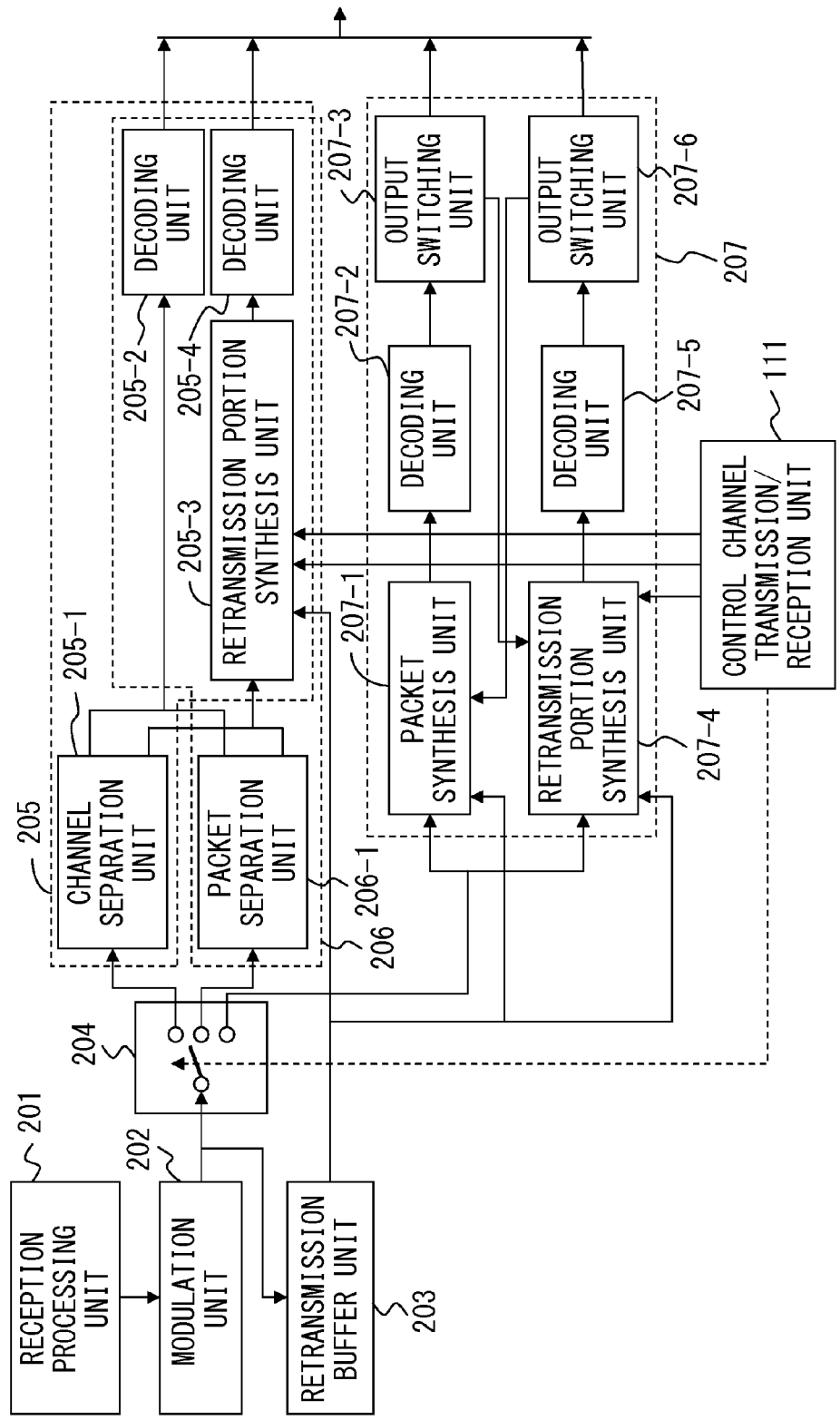
F I G. 2

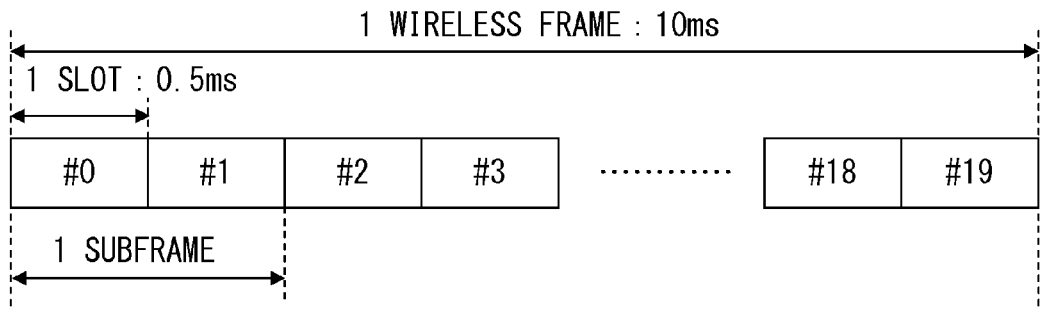
F I G. 4 A
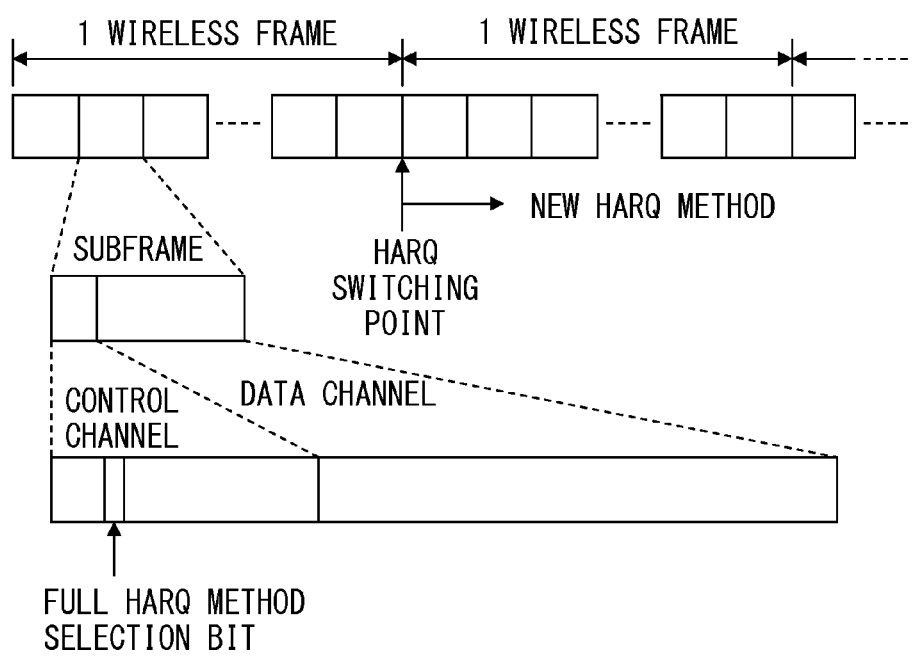
F I G. 4 B

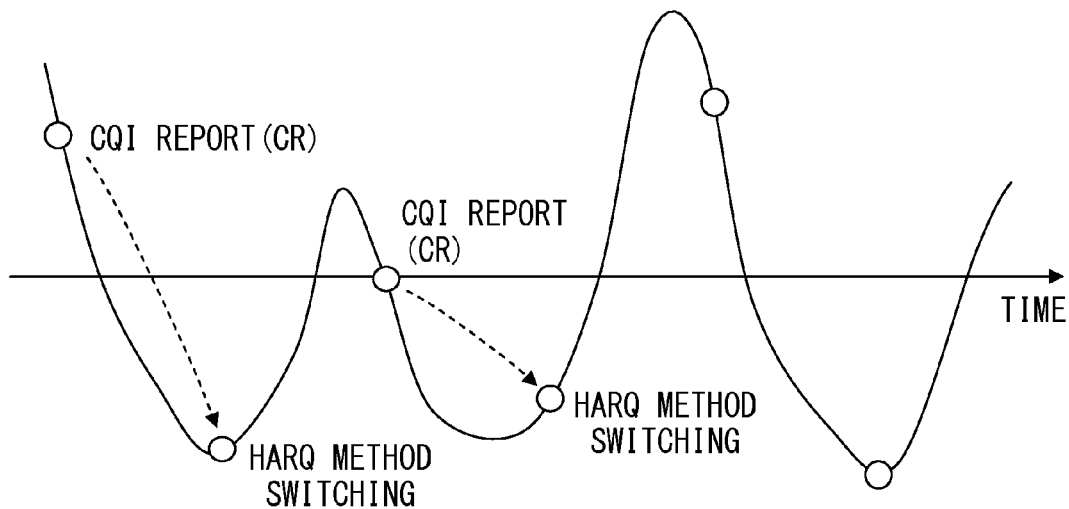
F I G. 5 A
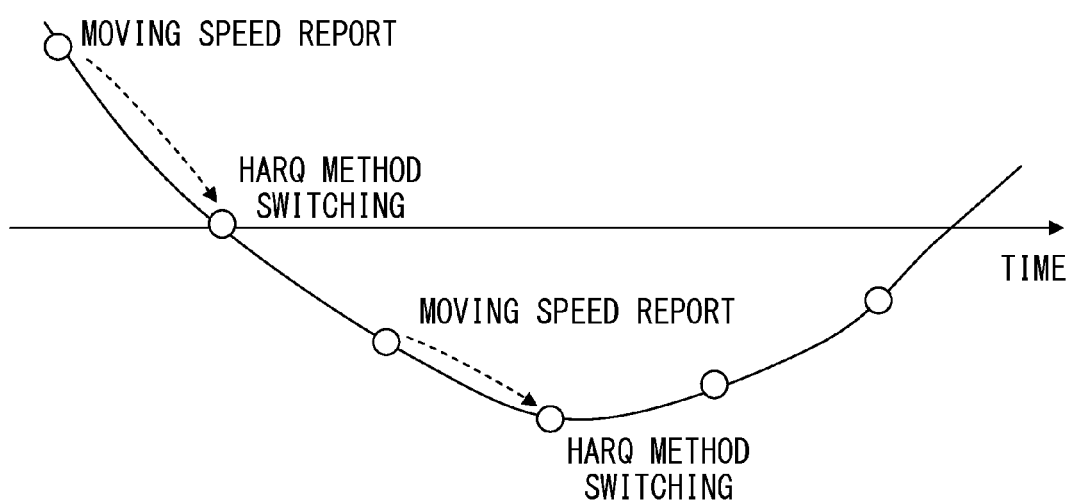
F I G. 5 B

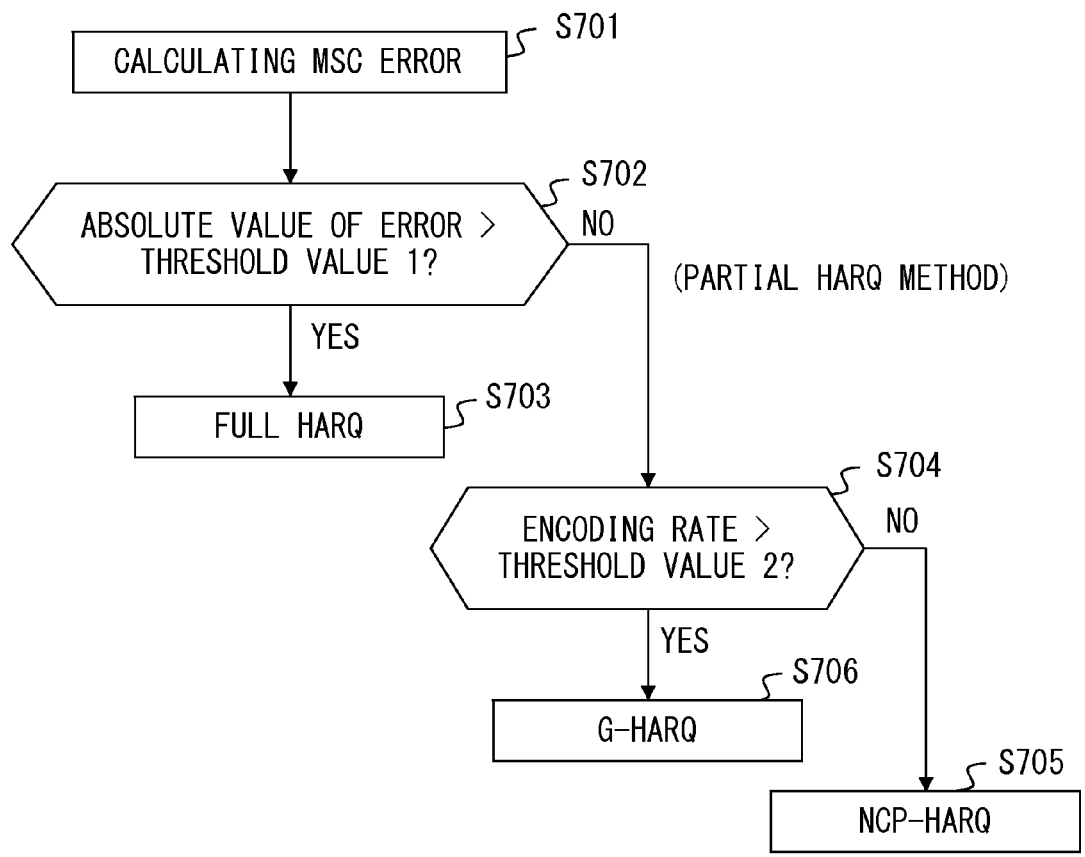
F I G. 7

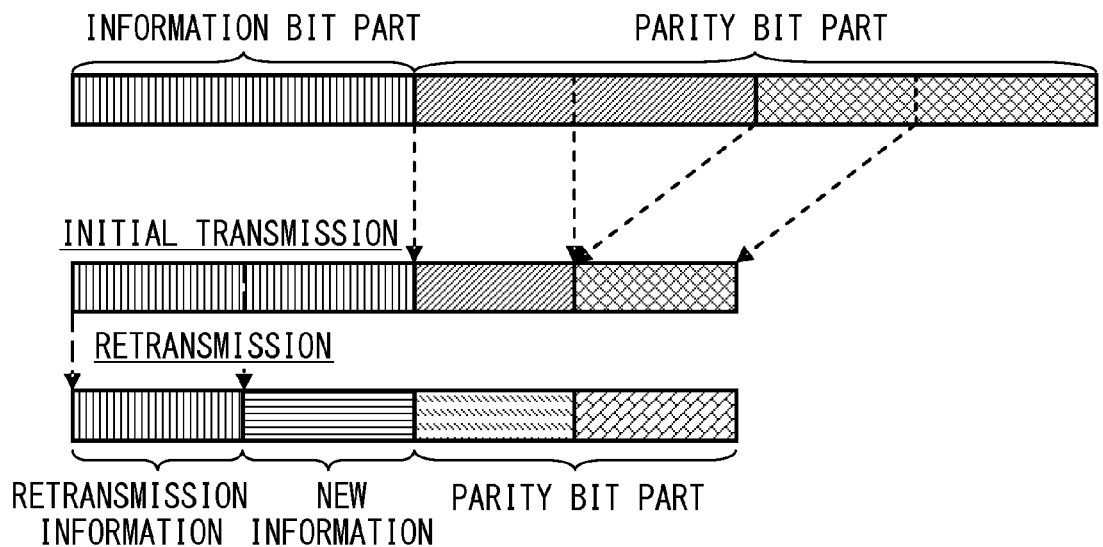
F I G. 10

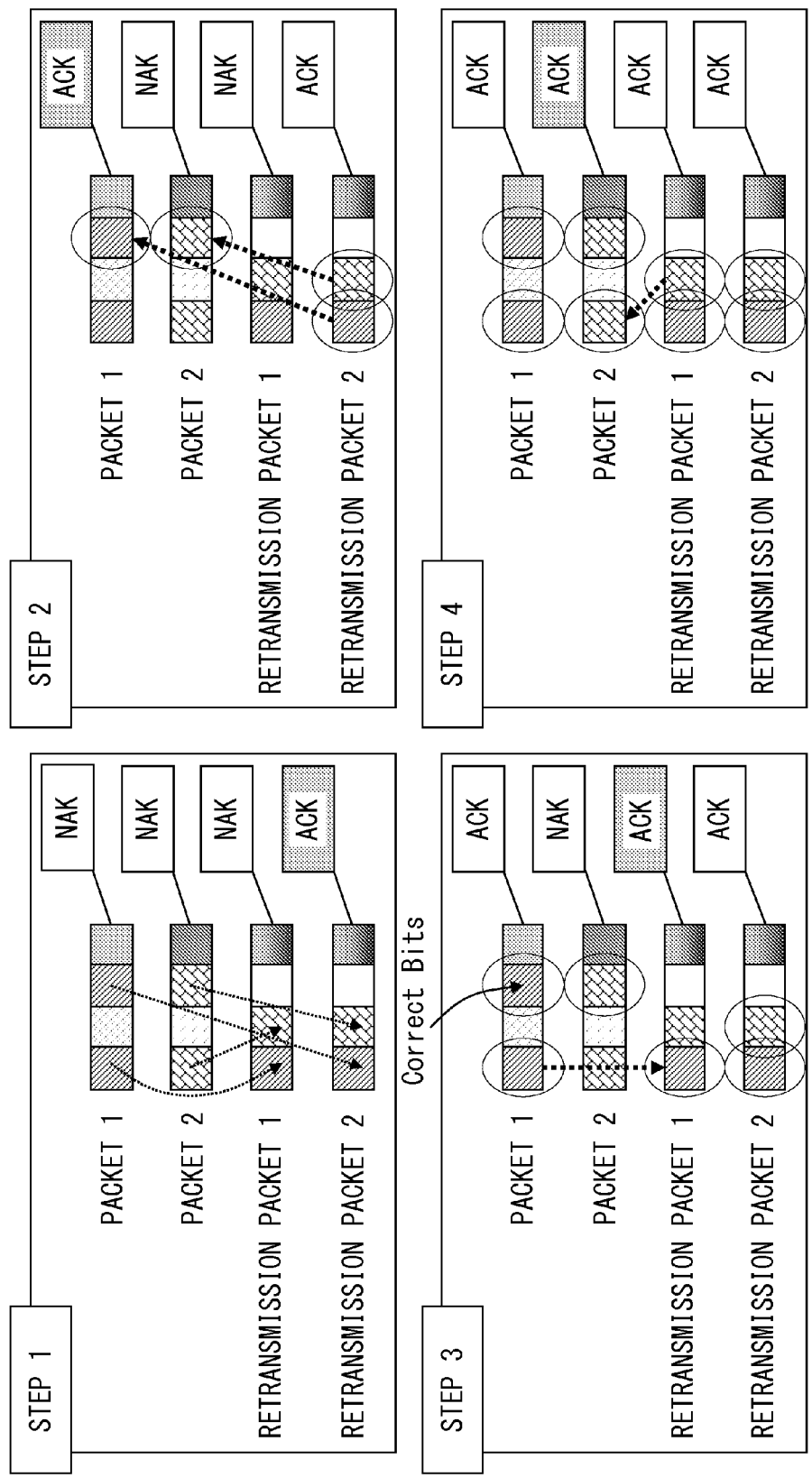
F I G. 1 2

US 8,457,059 B2

TRANSMISSION APPARATUS, RECEPTION APPARATUS, COMMUNICATION SYSTEM AND COMMUNICATION METHOD USING ADAPTIVE HYBRID AUTOMATIC RETRANSMISSION REQUEST METHOD

CROSS-REFERENCE TO RELATED APPLICATION

This application is a continuation of PCT application PCT/JP2008/003032, which was filed on Oct. 24, 2008, now pending, the contents of which are herein wholly incorporated by reference.

FIELD

Embodiments described herein relate to a technique for retransmitting transmission information based on acknowledgement information returned from a reception apparatus to a transmission apparatus in packet communication technology.

BACKGROUND

With new cellular phone communication standards such as LTE (Long Term Evolution) and the like currently being standardized by a standards organization 3GPP (3rd Generation Partnership Project), packet communication technology that enables a high-speed communication in a mobile terminal has been developed.

In a packet communication, a reception apparatus receives communication information while performing error detection based on an error correction code added by a transmission apparatus to a communication packet. Then, the reception apparatus returns, to the transmission apparatus, whether or not the communication packet is successfully received as ACK (positive ACKnowledgement) or NAK (Negative AcKnowledgement). The transmission apparatus retransmits transmission information if the reception apparatus returns NAK or if the transmission apparatus may not receive acknowledgement until an appropriate amount of time elapses from the transmission of a packet.

SUMMARY

According to an aspect of the embodiments discussed herein, a transmission apparatus includes a first encoding unit configured to generate a new packet from a new portion obtained from a block which is generated from information bits, to generate a retransmission packet from a retransmission portion obtained from a block which is generated from information bits and is held for a retransmission, and to assign the new packet and the retransmission packet to a communication channel respectively, a second encoding unit configured to assign, to a communication channel, a packet obtained by mixing the new portion and the retransmission portion, a encoding method switching unit configured to switch between operations of the first encoding unit and the second encoding unit, so that communication channel data output from the first encoding unit or the second encoding unit is transmitted, and a transmission control unit configured to control the encoding method switching unit based on information indicating a communication quality of the communication channel in a reception apparatus.

Additional objects and advantages of the embodiments will be set forth in part in the description which follows, and in part will be obvious from the description, or may be learned by practice of the embodiments. The object and advantages of the embodiments will be realized and attained by means of the elements and combinations particularly pointed out in the appended claims.

It is to be understood that both the foregoing summary description and the following detailed description are exemplary and explanatory and are not restrictive of the embodiments, as claimed.

BRIEF DESCRIPTION OF DRAWINGS

FIG. 2 illustrates a configuration of an embodiment of a reception apparatus in the packet transmission/reception system;

FIGS. 4A and 4B illustrate a data format of a control channel in an E-UTRA communication system;

FIGS. 5A and 5B are an explanatory view of a relationship between CQI and a terminal moving speed;

FIG. 7 is an operational flowchart illustrating an HARQ method switching process executed by a control channel transmission/reception unit in a downlink side transmission apparatus and an uplink side reception apparatus;

FIG. 10 is an explanatory view of the G-HARQ method;

FIG. 12 is an explanatory view of operations of a G-HARQ decoding unit.

DESCRIPTION OF EMBODIMENTS

Figure 1:
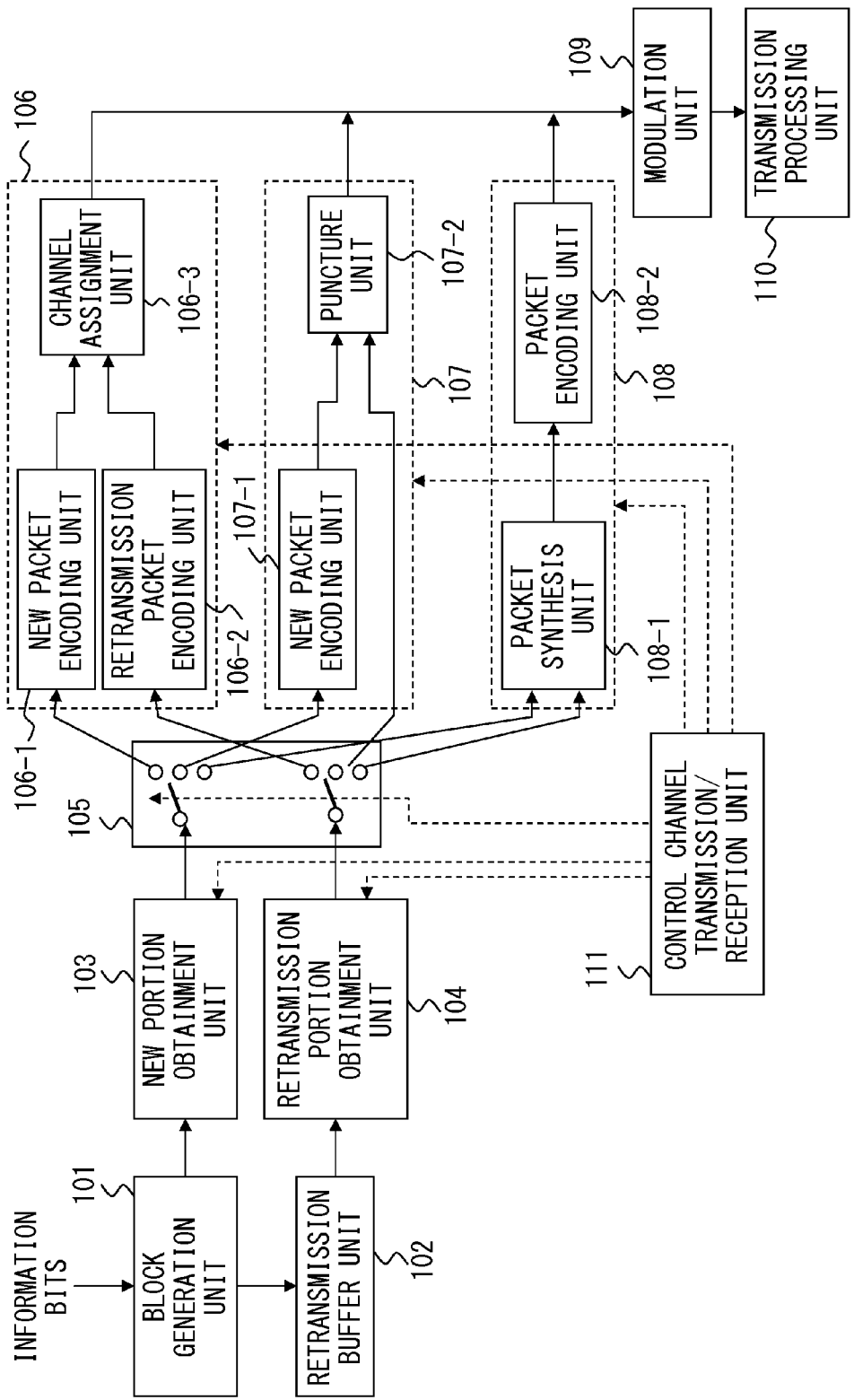
FIG. 1 illustrates a configuration of an embodiment of a transmission apparatus in a packet transmission/reception system.

Embodiments are described in detail below with reference to the drawings.

Regarding the embodiments discussed herein, the following observations are made.

A scheme called HARQ (Hybrid Automatic Repeat reQuest) is adopted as a retransmission technique by LTE and the like. With HARQ, a retransmission pattern is determined on a transmission apparatus side considering that unsuccessfully decoded data is not discarded but combined and decoded with retransmission data in a reception apparatus, for example, in a process of Layer 1 protocol level of LTE or the like. Then, unsuccessfully received data is not discarded but combined and decoded with retransmission data on the reception apparatus side.

The HARQ methods includes a CC (Chase Combining) method and an IR (Incremental Redundancy) method.

With the CC method, a transmission apparatus retransmits a copy of a packet encoded identically to an initially transmitted packet at the time of a retransmission. A reception apparatus synthesizes the unsuccessfully received first packet with the retransmitted packet, and decodes the whole of the synthesized signal. As a result, SNR (Signal to Noise Ratio) accumulatively increases to obtain a diversity gain in a temporal direction, and the accuracy of decoding in the reception apparatus improves, leading to reductions in packet errors.

In the meantime, with the IR method, a transmission apparatus not transmits a simple repetition of an entire packet encoded identically to the initially transmitted packet but incrementally transmits additional redundant information at the time of a retransmission. A reception apparatus synthesizes the unsuccessfully received first packet with the redundant information included in the incrementally retransmitted packet, and decodes the whole of the synthesized signal. As a result, the redundant information used for the decoding increases, and SNR rises accumulatively. Consequently, the accuracy of the decoding in the reception apparatus improves, leading to reductions in packet errors.

To reduce the necessity of buffering in the reception apparatus, an HARQ method based on N-channel stop and wait protocol is proposed on the basis of the above described two methods. With this method, a transmission apparatus fundamentally performs an operation for transmitting the next frame by waiting for corresponding ACK returned from a reception apparatus after transmitting a frame. The stop and wait mechanism is simple. However, since the transmission apparatus needs the operation for waiting for acknowledgement from the reception apparatus, transmission efficiency decreases. Accordingly, in the N-channel stop and wait process, when one HARQ process waits for acknowledgement from the reception apparatus, another HARQ process may use the corresponding channel in order to transmit another data. This HARQ process is widely used in many communication standards such as IEEE802.16e, LTE and the like.

With the above described normal HARQ method, a transmission apparatus needs to assign a retransmission packet to a new channel once a retransmission is requested. This generally poses a problem that a lot of channel resources are wasted. In the following description, this HARQ method is referred to as a full HARQ method in a sense that a channel is fully occupied.

Accordingly, a technique called an NCP (Non-Complete Puncture)-HARQ method has been proposed for 1xEV-DV standard, for example, as described in Wu Jianming, W. Tong, and J. Li, "Non-complete puncture based retransmission for HARQ", C50-20011105-025, 3GPP2 TSG-C WG5, Nov. 5, 2001 in order to reduce the waste of channel resources in the HARQ method.

With the NCP-HARQ method, a transmission apparatus makes a hole and inserts a retransmission packet, namely, punctures the retransmission packet in a portion of a frame configuration bit part, to which a parity bit part of a new packet is to be assigned, in a channel to which the newly flowing packet is assigned. At this time, the new packet and the retransmission packet are encoded independently. A reception apparatus separates the new packet and the retransmission packet, which are mixed in one channel, and individually decodes the packets. The reception apparatus executes a packet decoding process based on a CC method or an IR method for the retransmitted packet.

With the NCP-HARQ method, a retransmission packet is punctured in a parity bit part in the same channel frame as a newly flowing packet. Therefore, channel resources are not wasted, leading to considerable improvements in an entire throughput.

With the NCP-HARQ method, however, the number of bits of a retransmission packet increases if a newly flowing packet is encoded at a high encoding rate, and the number of puncture bits becomes insufficient in a parity bit part. As a result, the NCP-HARQ method has a problem that a retransmission process is delayed.

To overcome this problem, a G (Group based)-HARQ method has been developed, for example, as described in Wu Jianming "Grouped and Encoded Packet based HARQ for LTE-Advanced", R1-083777, 3GPP TSG-RAN1#54BIS, Prague, Czech, Sep. 29-Oct. 3, 2008.

With the G-HARQ method, a transmission apparatus groups retransmission data along with new data not in a parity bit part but an information part (payload) of a new packet in a channel to which the newly flowing packet is assigned. At this time, the new data and the retransmission data are newly encoded as one piece, and also a parity bit is newly calculated, so that the encoded data is transmitted as a new packet. A reception apparatus separates the new packet and the retransmission packet by decoding the packet. The reception apparatus executes a packet decoding process based on the CC method or the IR method for the retransmitted packet.

With the G-HARQ method, a retransmission packet is grouped in an information bit part in the same channel frame as a newly flowing packet. Therefore, this method has an advantage when a data packet is delivered at a high encoding rate in addition to an advantage that channel resources are not wasted. However, at a low encoding rate, the NCP-HARQ method is more advantageous because the G-HARQ method imposes a load on an information bit part of a newly flowing packet.

Additionally, if a retransmission rate is high (namely, if channel fluctuations are large), the full HARQ method is more advantageous than the NCP-HARQ method and the G-HARQ method, which significantly delay a retransmission process.

As described above, the full HARQ method, the NCP-HARQ method and the G-HARQ method have the advantages and disadvantages depending on transmission conditions such as an encoding rate, a transmission rate and the like.

FIG. 1 illustrates a configuration of an embodiment of a transmission apparatus in a packet transmission/reception system. FIG. 2 illustrates a configuration of an embodiment of a reception apparatus in the packet transmission/reception system. The packet transmission/reception system is configured, for example, as a communication system between a wireless mobile terminal (cellular phone terminal or the like) and a wireless base station. In this case, the transmission apparatus illustrated in FIG. 1 is included on a downlink side of the wireless base station and on an uplink side of the wireless mobile terminal. The reception apparatus illustrated in FIG. 2 is included on an uplink side of the wireless base station and on a downlink side of the wireless mobile terminal. The packet reception system may be realized, for example, as an E-UTRA (Evolved Universal Terrestrial Radio Access) system in the LTE communication standard currently being standardized by 3GPP.

The transmission apparatus illustrated in FIG. 1 includes a block generation unit 101, a retransmission buffer unit 102, a new portion obtainment unit 103, a retransmission portion obtainment unit 104, an HARQ method switching unit 105 (decoding method switching unit), a full HARQ encoding unit 106 (first encoding unit), an NCP-HARQ encoding unit 107 (third encoding unit) and a G-HARQ encoding unit 108 (fourth encoding unit), which configure a partial HARQ encoding unit (second encoding unit), a modulation unit 109, a transmission processing unit 110 and a control channel transmission/reception unit 111 (transmission control unit). The full HARQ encoding unit 106 is composed of a new packet encoding unit 106-1, a retransmission packet encoding unit 106-2 and a channel assignment unit 106-3. The NCP-HARQ encoding unit 107 is composed of a new packet encoding unit 107-1 and a puncture unit 107-2. The G-HARQ encoding unit 108 is composed of a packet synthesis unit 108-1 and a packet encoding unit 108-2.

The reception apparatus illustrated in FIG. 2 includes a reception processing unit 201, a demodulation unit 202, a retransmission buffer unit 203, an HARQ method switching unit 204 (encoding method switching unit), a full HARQ decoding unit 205 (first decoding unit), an NCP-HARQ decoding unit 206 (third decoding unit) and a G-HARQ decoding unit 207 (fourth decoding unit), which configure a partial HARQ decoding unit (second decoding unit), and a control channel transmission/reception unit 111 (reception control unit). The control channel transmission/reception unit 111 may be made common to the control channel transmission/reception unit 111 on the transmission apparatus side illustrated in FIG. 1. The full HARQ decoding unit 205 is composed of a retransmission channel separation unit 205-1, a decoding unit 205-2, a retransmission portion synthesis unit 205-3, and a decoding unit 205-4. The NCP-HARQ decoding unit 206 is composed of a packet separation unit 206-1, a decoding unit 205-2 common to the above described one, a retransmission portion synthesis unit 205-3 and a decoding unit 205-4. The G-HARQ decoding unit 207 is composed of a packet synthesis unit 207-1, a decoding unit 207-2, an output switching unit 207-3, a retransmission portion synthesis unit 207-4, a decoding unit 207-5, and an output switching unit 207-6.

This embodiment enables the full HARQ method, the NCP-HARQ method and the G-HARQ method to be automatically switched depending on transmission conditions by using a characteristic that these methods have the following advantages and disadvantages depending on the transmission conditions such as an encoding rate, a retransmission rate and the like.

(Characteristic 1)

If the retransmission rate of a data packet is high, the full HARQ method is more advantages than the NCP-HARQ method and the G-HARQ method, which significantly delay a retransmission process.

(Characteristic 2)

If the retransmission rate of a data packet is low and a data packet is delivered at a high encoding rate, the G-HARQ method is more advantageous.

(Characteristic 3)

If the retransmission rate of a data packet is low and a data packet is delivered at a low encoding rate, the NCP-HARQ method is more advantageous.

Specifically, the control channel transmission/reception unit 111 controls the HARQ method switching unit 105 in the transmission apparatus illustrated in FIG. 1, or the control channel transmission/reception unit 111 common to that of FIG. 1 controls the HARQ method switching unit 204 in the reception apparatus illustrated in FIG. 2, whereby the HARQ methods are automatically switched.

In the following description, the NCP-HARQ method and the G-HARQ method are referred to as a partial HARQ method in contrast with the full HARQ method in a sense that a channel of a newly flowing packet is partially used.

To initially determine which of the full HARQ method and the partial HARQ method is to be adapted in a retransmission process, an error between an MCS (Modulation Code Scheme) level determined based on CQI (Channel Quality Indicator) notified from the wireless mobile terminal to the wireless base station and an MCS level used in a currently performed communication is evaluated in this embodiment.

Figure 3:
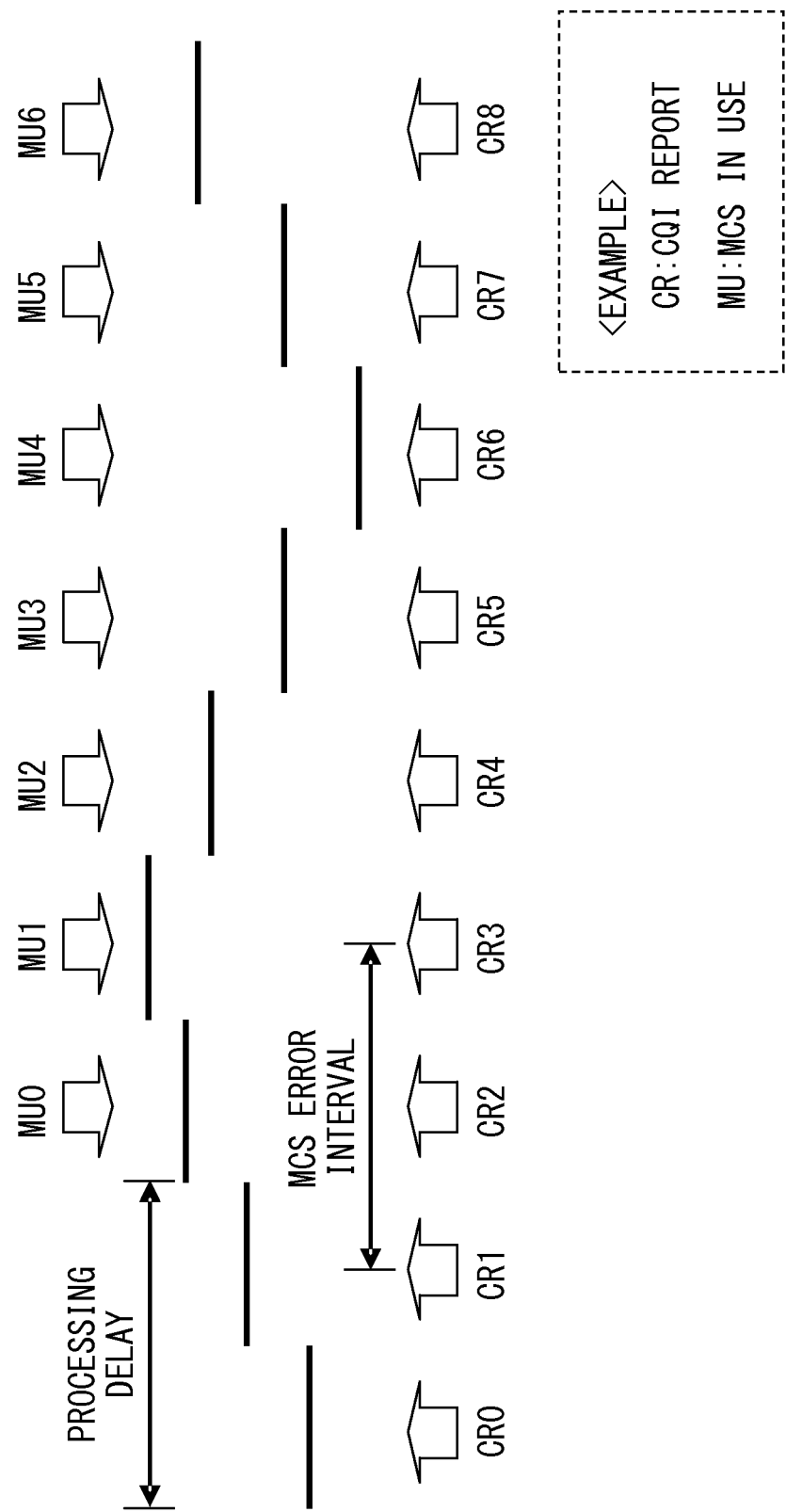
FIG. 3 is an explanatory view of an MCS error.

Assume that a CQI notification (CQI report) of CR such as CR0, CR1, . . . , CR8 is periodically made from each wireless mobile terminal to the wireless base station at certain intervals as illustrated in FIG. 3.

Because of a processing delay including a propagation time, a feedback interval and a decoding time, MCS (Modulation Code Scheme) used in a currently performed communication=MU (Modulation code scheme in Use) is determined based on CQI notified previously by the amount of the processing delay. For example, in FIG. 3, MU0 is measured based on CR0, and MU1 is observed based on CR1. A large value of an error between CR (a previous value by the amount of a processing delay) corresponding to the current MU and the currently notified CR means that the wireless mobile terminal side attempts to frequently change MCS due to many occurrences of reception errors. Assuming that this error is referred to as an MCS error, for example, the MCS error for MU1 is simply calculated as follows as a difference between CRs in a section separate by an MCS error interval corresponding to the above described processing delay.

$$MCS1\ error=CR3-CR1$$

If a feedback interval does not vary, the MCS error interval is normally equal to the processing delay. A mathematical expression indicating the MCS error is represented as follows in normal cases.

$$MCS_n^{(Error)}=CR_n-CR_{n-k} \qquad (1)$$

where k is an index of the processing delay.

A large value of the measured MCS error is considered to indicate that many transmission errors occur between the transmission apparatus and the reception apparatus and a retransmission rate therefore becomes high. Accordingly, if the absolute value of the MCS error is larger than a given threshold value (=threshold value 1), the retransmission rate is expected to be high. Accordingly, it is preferable to adopt the full HARQ method based on the above described characteristic 1.

In the meantime, if the absolute value of the MCS error is equal to or smaller than the threshold value 1, the retransmission rate becomes low. Therefore, it is preferable to adopt the partial HARQ method in a retransmission process. In this case, a transmission encoding rate or an MCS level under a physical channel condition given via a control channel is used as a determination criterion in this embodiment in order to adapt either the NCP-HARQ method or the G-HARQ method. For example, if the encoding rate is higher than a given threshold value (=threshold value 2), it is preferable to adopt the G-HARQ method based on the above described characteristic 2. In contrast, if the encoding rate is equal to or lower than the threshold value 2, it is preferable to adopt the NCP-HARQ method based on the above described characteristic 3.

In an actual communication system, an HARQ process needs to be executed according to an instruction issued by a control signal transmitted in a control channel.

For example, if an E-UTRA communication system is adopted as a packet transmission/reception system, a data format illustrated in FIG. 4 is adopted. Namely, for example, two of 20 slots #0 to #20 having a length of 0.5 msec (milli seconds), into which a wireless frame having a length of 10 msec is partitioned, configure one subframe as illustrated in FIG. 4A. Then, an L1 control channel and a data channel are assigned within the subframe as illustrated in FIG. 4B.

In the data channel, a new packet and a retransmission packet, which are information bits, are inserted and transmitted.

In the L1 control channel, not only the above described CQI but various items of control information needed to be communicated between the transmission apparatus and the reception apparatus in accordance with an adopted HARQ method are inserted and transmitted.

Here, the notification timing of CQI for calculating the MCS error criterion for selecting either the full HARQ method or the partial HARQ method is notified in subframe units (or slot units) illustrated in FIG. 4 by using, for example, an uplink control channel from the wireless mobile terminal toward the wireless base station. Also the selection of the full HARQ method or the partial HARQ method is performed in time units (=high-speed criterion) corresponding to the subframe (or slot).

In contrast, a long-term parameter such as a moving speed of the wireless mobile terminal may be notified in units (low-speed criterion of 10 to 20 msec to 50 msec) longer than the subframe units illustrated in FIG. 4 by using high-layer control information, for example, on an uplink from the wireless mobile terminal toward the wireless base station, and the selection of the full HARQ method or the partial HARQ method may be made based on the long-term parameter. In this case, a high moving speed corresponds to a large value of the above described MCS error, whereas a low moving speed corresponds to a small value of the MCS error. Accordingly, moving speed information periodically notified from the wireless mobile terminal may be handled similarly to the MCS error.

Additionally, in response to the above described selection operation, a 1-bit full HARQ method selection bit indicating whether to select either the full HARQ method (=1) or the partial HARQ method (=0) may be inserted in a high-layer control channel, for example, on the downlink from the wireless base station toward the wireless mobile terminal (see FIG. 4B).

In this case, the HARQ method switching point may be implemented as the timing of each delimitation of a 10-msec wireless frame. Alternatively, the HARQ method switching point may be implemented as the timing of each delimitation of every plural wireless frames.

If the above described high-speed criterion is adopted, the full HARQ method selection bit may be inserted in the L1 control channel. In this case, switching timing between the CQI report and an HARQ method varies relatively frequently as illustrated in FIG. 5A.

In contrast, if the above described low-speed criterion is adopted, switching timing between the moving speed report and the HARQ method varies relatively moderately as illustrated in FIG. 5B.

Next, three ideas are considered as an implementation method for controlling a selection between the NCP-HARQ method and the G-HARQ method. The first idea is a method using one bit of the L1 control channel. The second idea is a method using one bit from the above described high-layer control information. The third idea is a method making a transparent determination, performed by the transmission apparatus and the reception apparatus, for making a comparison between an encoding rate calculated based on an MCS level or the like and the given threshold value (=threshold value 2).

Figure 6:
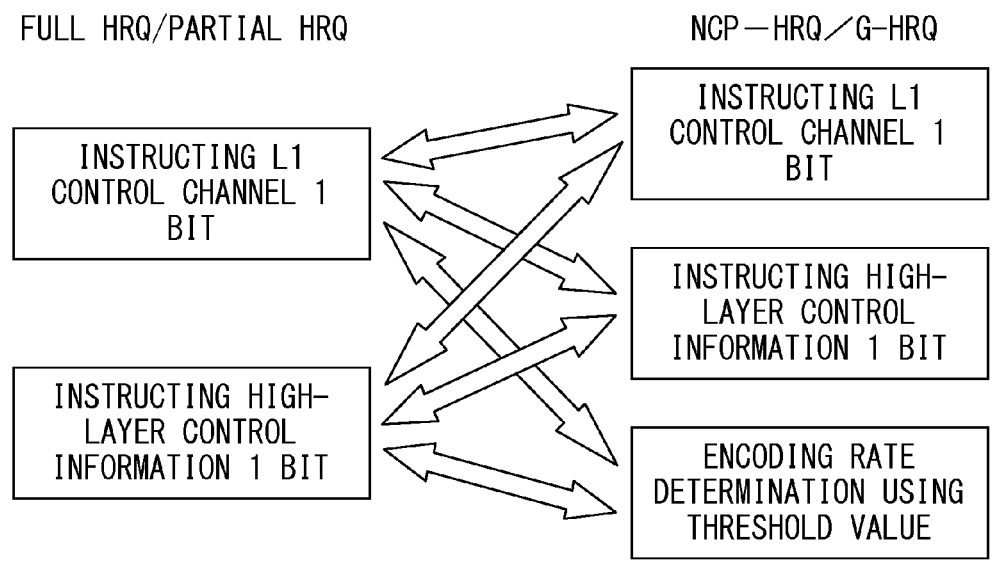
FIG. 6 is an explanatory view of switching methods between a full HARQ method and a partial HARQ method, and an NCP-HARQ method and a G-HARQ method.

In summary, arbitrary one of six types of methods represented with arrows in FIG. 6 may be selected as an HARQ method selection instruction method. However, the following methods are more preferable as the selection instruction method in terms of increasing the efficiency of the control channel and further reducing the ambiguity of the instruction.

One bit is used from the high-layer control information in order to select and instruct full HARQ or partial HARQ.

A determination for making a comparison between an encoding rate calculated based on the MCS level or the like and the given threshold value (=threshold value 2) is performed respectively by the transmission apparatus and the reception apparatus in order to select and instruct NCP-HARQ or G-HARQ without adding a bit.

Specific operations of the embodiments illustrated in FIGS. 1 and 2 based on the above described HARQ method selection methods are described below.

One example of control operations for selecting an HARQ method, which are performed by the control channel transmission/reception unit 111, in the case where the transmission apparatus of FIG. 1 is installed, for example, in a downlink system of the wireless base station are described with reference to an operational flowchart illustrated in FIG. 7.

Initially, the block generation unit 101 generates a block of a given size with information bits to be transmitted in the transmission apparatus illustrated in FIG. 1. The size of the block generated by the block generation unit 101 is equal to the quantity of information bits storable in one packet. Namely, a normal packet transmitted by the transmission apparatus includes information bits equivalent to one block.

The retransmission buffer unit 102 temporarily holds a block of information bits, which is generated by the block generation unit 101, in preparation for a retransmission. The retransmission buffer unit 102 may sequentially discard blocks that have been properly decoded in the reception apparatus and do not need to be retransmitted any more.

The control channel transmission/reception unit 111 calculates an MCS error by calculating the above described expression (1) based on CQI (=CR) periodically notified with a particular bit within the L1 control channel from the control channel transmission/reception unit 111 within the reception apparatus of FIG. 2 inside the wireless mobile terminal (step S701 of FIG. 7).

Next, the control channel transmission/reception unit 111 determines whether or not the calculated MCS error is larger than the given threshold value (=threshold value 1) (step S702 of FIG. 7).

If determining that the calculated MCS error is larger than the threshold value 1 in the above described determination, the control channel transmission/reception unit 111 controls the HARQ method switching unit 105 to operate the full HARQ encoding unit 106 (step S703 of FIG. 7).

Figure 8A:
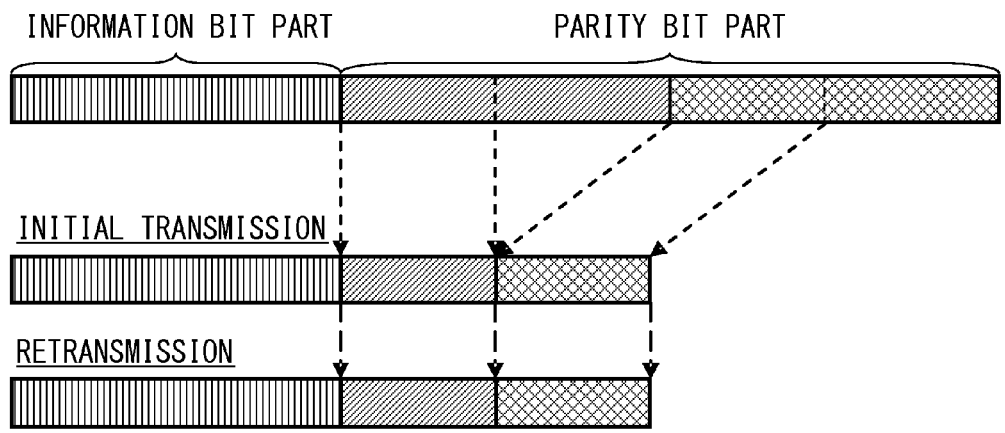
FIGS. 8A and 8B are an explanatory view of the full HARQ method.
Figure 8B:
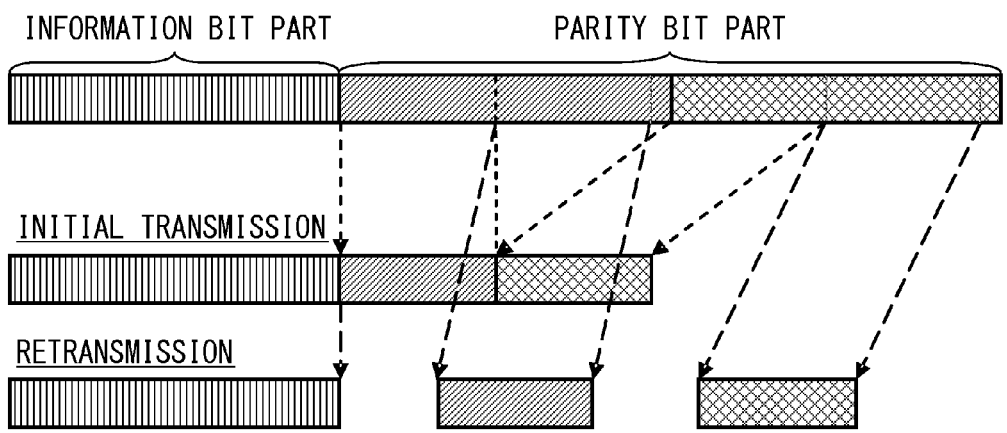

FIG. 8 is explanatory views of the full HARQ encoding method executed by the full HARQ encoding unit 106. The full HARQ method includes two major methods such as the CC method and the IR method as described above. With the CC method, the transmission apparatus retransmits a copy of a packet encoded identically to the initially transmitted packet at the time of a retransmission as illustrated in FIG. 8A. In contrast, with the IR method, the transmission apparatus incrementally transmits additional redundant information without transmitting a simple repetition of the whole of the packet encoded identically to the initially transmitted packet at the time of a retransmission as illustrated in FIG. 8B.

When operating the full HARQ encoding unit 106, the control channel transmission/reception unit 111 notifies the new portion obtainment unit 103 and the retransmission portion obtainment unit 104 of a new portion and a retransmission portion, which are included in a packet to be newly transmitted, according to a control signal received from the reception apparatus side via a control channel. Specifically, the control channel transmission/reception unit 111 initially instructs the new portion obtainment unit 103 to always transmit a new block generated by the block generation unit 101. Moreover, the control channel transmission/reception unit 111 instructs the retransmission portion obtainment unit 104 to retransmit a transmitted block held in the retransmission buffer unit 102 if the number of NAKs received from the reception apparatus side reaches a given number. Here, if the CC method is adopted, the retransmission portion obtainment unit 104 is instructed to retransmit a copy of the same block as that at the time of the initial transmission as illustrated in FIG. 8A. In contrast, if the IR method is adopted, the retransmission portion obtainment unit 104 is instructed to retransmit additional redundant information of the block at the time of the initial transmission as illustrated in FIG. 8B.

Here, ACK and NAK are signals that are inserted, for example, in the above described L1 control channel (see FIG. 4B) and received from the reception apparatus, for example, within the wireless mobile terminal. These signals indicate whether or not a packet reception error has occurred within the reception apparatus. ACK or NAK is returned from the reception apparatus for each reception packet. Accordingly, the transmission apparatus needs to retransmit a transmission block included in a packet corresponding to NAK. Therefore, upon receipt of NAKs for a plurality of blocks, the control channel transmission/reception unit 111 within the transmission apparatus retransmits the blocks respectively corresponding to the NAKs.

When the full HARQ encoding unit 106 is operated, the new portion obtainment unit 103 always obtains, as a new portion, the whole of a block generated by the block generation unit 101 according to an instruction from the control channel transmission/reception unit 111.

Additionally, in this case, if the number of received NAKs is smaller than a given number, this is not yet the timing of retransmitting a transmitted block. Therefore, the retransmission portion obtainment unit 104 does not obtain a block held in the retransmission buffer unit 102 as a retransmission portion in accordance with an instruction from the control channel transmission/reception unit 111. In contrast, if the number of received NAKs reaches the given number, the retransmission portion obtainment unit 104 obtains information of a block of a packet corresponding to each NAK as a retransmission portion among blocks held in the retransmission buffer unit 102. If the CC method is adopted, a copy of the same block as that at the time of the initial transmission, which corresponds to NAK, is obtained as a retransmission portion. In contrast, if the IR method is adopted, additional redundant information of the block at the time of the initial transmission, which corresponds to NAK, is obtained as a retransmission portion.

A new block obtained by the new portion obtainment unit 103 is input to the new packet encoding unit 106-1 within the full HARQ encoding unit 106 via the HARQ method switching unit 105. If information of a retransmission block is obtained by the retransmission portion obtainment unit 104, the information is input to the retransmission packet encoding unit 106-2 within the full HARQ encoding unit 106 via the HARQ method switching unit 105.

The new packet encoding unit 106-1 generates a new packet that includes the new block in an information bit part and a corresponding parity bit in a parity bit part.

When a retransmission block is input, the retransmission packet encoding unit 106-2 generates a retransmission packet that includes the retransmission block in an information bit part and a corresponding parity bit in a parity bit part.

The channel assignment unit 106-3 assigns the generated new packet and retransmission packet to individual communication channels (individual subframes or slots in FIG. 4), and outputs resultant frame data to the modulation unit 109.

As described above, when the full HARQ encoding unit 106 is operated, a new packet and a retransmission packet are assigned individual communication channels and individually transmitted.

Next, if determining that the MCS error is equal to or smaller than the threshold value 1 in step S702 of FIG. 7, the control channel transmission/reception unit 111 of the transmission apparatus of FIG. 1 further determines whether or not the encoding rate of the currently selected encoding method is higher than the given threshold value (=threshold value 2) (step S704 of FIG. 7). This encoding rate may be calculated based on an MCS level determined based on CQI that is periodically received by the control channel transmission/reception unit 111, for example, from the wireless mobile terminal. For example, if an E-UTRA communication system is adopted as the packet transmission/reception system, the MCS level is an indicator for determining any of various types of modulation methods such as QPSK (Quadrature Phase Shift Keying), 16QAM (16 Quadrature Amplitude Modulation), 64QAM and the like, and an encoding method. When the MCS level is determined, the encoding rate (encoding efficiency) may be determined.

If determining that the encoding rate is equal to or lower than the threshold value 2 in the above described determination, the control channel transmission/reception unit 111 controls the HARQ method switching unit 105 to operate the NCP-HARQ encoding unit 107 (step S705 of FIG. 7).

Figure 9:
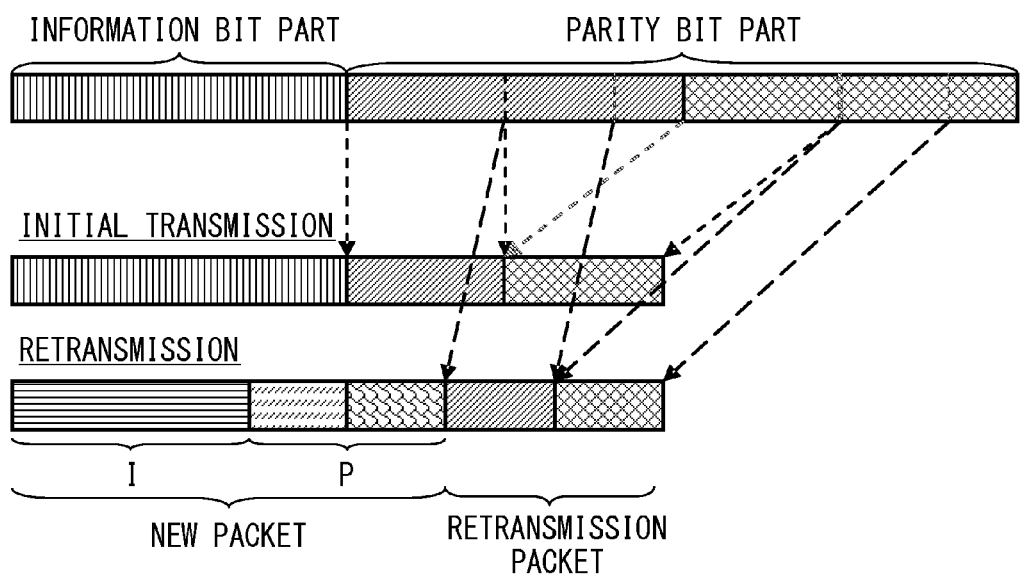
FIG. 9 is an explanatory view of the NCP-HARQ method.

FIG. 9 is an explanatory view of the NCP-HARQ encoding method executed by the NCP-HARQ encoding unit 107. With the NCP-HARQ method, the transmission apparatus punctures a retransmission packet in a portion of a frame configuration bit part, to which a parity bit part of a new packet is to be assigned, in a channel to which the new packet is assigned. At this time, as illustrated in FIG. 9, a parity bit P independent of information bits I of a new block is added to the new packet, and the retransmission packet encoded independently of the new packet is punctured.

When operating the NCP-HARQ encoding unit 107, the control channel transmission/reception unit 111 notifies the new portion obtainment unit 103 and the retransmission portion obtainment unit 104 of the new portion and the retransmission portion, which are included in a packet to be newly transmitted, according to a control signal received from the reception apparatus side via the control channel. Specifically, the control channel transmission/reception unit 111 initially instructs the new portion obtainment unit 103 to always transmit a new block generated by the block generation unit 101. Moreover, if the number of NAKs received from the reception apparatus side reaches a given number, the control channel transmission/reception unit 111 instructs the retransmission portion obtainment unit 104 to retransmit a transmitted block held in the retransmission buffer unit 102. Here, if the CC method is adopted, the retransmission portion obtainment unit 104 is instructed to retransmit a copy of the same block as that at the time of the initial transmission as illustrated in FIG. 8A. Alternatively, if the IR method is adopted, the retransmission portion obtainment unit 104 is instructed to retransmit additional redundant information of the block at the time of the initial transmission as illustrated in FIG. 8B.

When the NCP-HARQ encoding unit 107 is operated, the new portion obtainment unit 103 always obtains the whole of a block generated by the block generation unit 101 as a new portion in accordance with an instruction from the control channel transmission/reception unit 111.

Additionally, in this case, if the number of received NAKs is smaller than the given number, this is not yet the timing of retransmitting a transmitted block. Therefore, the retransmission portion obtainment unit 104 does not obtain a block held in the retransmission buffer unit 102 as a retransmission portion in accordance with an instruction from the control channel transmission/reception unit 111. In contrast, if the number of received NAKs reaches the given number, the retransmission portion obtainment unit 104 obtains information of a block of a packet corresponding to each NAK as a retransmission portion among blocks held in the retransmission buffer unit 102. If the CC method is adopted, a copy of the same block as that at the time of the initial transmission corresponding to NAK is obtained as a retransmission portion. Alternatively, if the IR method is adopted, additional redundant information of the block at the time of the initial transmission corresponding to NAK is obtained as a retransmission portion.

The new block obtained by the new portion obtainment unit 103 is input to the new packet encoding unit 107-1 within the NCP-HARQ encoding unit 107 via the HARQ method switching unit 105. Moreover, when the retransmission portion obtainment unit 104 obtains information of a retransmission block, the information is input to the puncture unit 107-2 within the NCP-HARQ encoding unit 107 via the HARQ method switching unit 105.

The new packet encoding unit 106-1 generates a new packet that includes the new block in an information bit part and includes a corresponding parity bit in a parity bit part.

The puncture unit 107-2 sequentially punctures information bits of a retransmission block output from the retransmission portion obtainment unit 104 in a portion of a frame configuration bit part, to which the parity bit part of the new packet is to be assigned, in a channel to which the new packet is assigned. As a result, the assignment of the parity bit part in the new packet is delayed by the quantity of the punctured portion of the frame configuration bits. In the puncture process, while a pattern is varied a portion of the frame configuration bits is selected and the portion is punctured until the assignment of all information bits of the retransmission block output from the retransmission portion obtainment unit 104 is complete. The puncture unit 107-2 outputs, to the modulation unit 109, the resultant synthesis packet (see the retransmission packet of FIG. 9) assigned to the frame of one communication channel.

As described above, when the NCP-HARQ encoding unit 107 is operated, a new packet and a retransmission packet are assigned to one communication channel and transmitted as one piece by puncturing the retransmission packet in a parity bit part of the new packet.

Then, if determining that the encoding rate is higher than the threshold value 2 in the determination of step S704 of FIG. 7, the control channel transmission/reception unit 111 controls the HARQ method switching unit 105 to operate the G-HARQ encoding unit 108 (step S706 of FIG. 7).

FIG. 10 is an explanatory view of the G-HARQ encoding method executed by the G-HARQ encoding unit 107. With the G-HARQ method, the transmission apparatus groups a retransmission block along with a new block not in a parity bit part but in an information part (payload) of a newly flowing packet. At this time, the new block and the retransmission block are newly encoded as one piece, and also a parity bit is newly calculated, so that the blocks are transmitted as a new packet.

When operating the G-HARQ encoding unit 108, the control channel transmission/reception unit 111 notifies the new portion obtainment unit 103 and the retransmission portion obtainment unit 104 of the new portion and the retransmission portion, which are included in the packet to be newly transmitted, according to a control signal received from the reception apparatus side via a control channel. Specifically, if the number of NAKs received from the reception apparatus side is smaller than a given number, the control channel transmission/reception unit 111 initially instructs the new portion obtainment unit 103 to always transmit a new block generated by the block generation unit 101. Alternatively, if the number of NAKs received from the reception apparatus side reaches the given number, the control channel transmission/reception unit 111 instructs the new portion obtainment unit 103 to transmit a portion of the new block generated by the block generation unit 101. Moreover, in this case, the control channel transmission/reception unit 111 instructs the retransmission portion obtainment unit 104 to retransmit a transmitted block held in the retransmission buffer unit 102. Here, if the CC method is adopted, the retransmission portion obtainment unit 104 is instructed to retransmit a copy of the same block as that at the time of the initial transmission as illustrated in FIG. 8A. In contrast, if the IR method is adopted, the retransmission portion obtainment unit 104 is instructed to retransmit additional redundant information of the block at the time of the initial transmission as illustrated in FIG. 8B.

When the G-HARQ encoding unit 107 is operated, the new portion obtainment unit 103 obtains the whole of the block generated by the block generation unit 101 as a new portion in accordance with an instruction from the control channel transmission/reception unit 111 if the number of received NAKs is smaller than the given number. In contrast, if the number of received NAKs reaches the given number, the new portion obtainment unit 104 obtains a portion of the block generated by the block generation unit 101 as a new portion.

Additionally, in this case, if the number of received NAKs is smaller than the given number, this is not yet the timing of retransmitting a transmitted block. Therefore, the retransmission portion obtainment unit 104 does not obtain a block held in the retransmission buffer unit 102 as a retransmission portion in accordance with an instruction from the control channel transmission/reception unit 111. In contrast, if the number of received NAKs reaches the given number, the retransmission portion obtainment unit 104 obtains information of a block of a packet corresponding to each NAK as a retransmission portion among blocks held in the retransmission buffer unit 102. If the CC method is adopted, a copy of the same block as that at the time of the initial transmission, which corresponds to NAK, is obtained as a retransmission portion. In contrast, if the IR method is adopted, additional redundant information of the block at the time of the initial transmission, which corresponds to NAK, is obtained as a retransmission portion.

The new block obtained by the new portion obtainment unit 103 is input to the puncture unit 108-1 within the G-HARQ encoding unit 108 via the HARQ method switching unit 105. If information of a retransmission block is obtained by the retransmission portion obtainment unit 104, the information is input to the puncture unit 108-1 within the G-HARQ encoding unit 108 via the HARQ method switching unit 105.

The packet synthesis unit 108-1 synthesizes an information bit part with only a new block output from the new portion obtainment unit 103 if a retransmission block is not output from the retransmission portion obtainment unit 104. In contrast, if the retransmission block is output from the retransmission portion obtainment unit 104, the packet synthesis unit 108-1 synthesizes an information bit part obtained by synthesizing the new block output from the new portion obtainment unit 103 with the retransmission block output from the retransmission portion obtainment unit 104 in a given synthesis pattern. As a result, the assignment of the information bit part in the new packet includes only the new block similarly to a normal packet if there is no retransmission block. In contrast, if there is a retransmission block, the information of the new block is reduced and delayed by the quantity of the inserted transmission block.

The packet encoding unit 108-2 generates a new packet that includes the above described new block and retransmission block in an information bit part and includes a corresponding parity bit in a parity bit part. After mapping the generated new packet in a frame of one communication channel, the packet encoding unit 108-2 outputs the frame data to the modulation unit 109.

As described above, when the G-HARQ encoding unit 107 is operated, a new packet and a retransmission packet are assigned to one communication channel and transmitted as one piece by puncturing the retransmission packet in an information bit part of the new packet.

In the transmission apparatus illustrated in FIG. 1, the modulation unit 109 modulates frame data output from any of the full HARQ encoding unit 106, the NCP-HARQ encoding unit 107 and the G-HARQ encoding unit 108, and outputs the modulated data to the transmission processing unit 110.

The transmission processing unit 110 executes given wireless transmission processes (D/A conversion and the like) for the modulated frame data, and transmits the data via an antenna not particularly illustrated.

One example of control operations for selecting an HARQ method, which are performed by the control channel transmission/reception unit 111, in the case where the reception apparatus illustrated in FIG. 2 is installed, for example, in a downlink system of the wireless mobile terminal are described next with reference to an operational flowchart illustrated in FIG. 11.

Initially, in the reception apparatus illustrated in FIG. 2, the reception processing unit 201 initially receives a signal transmitted from the transmission apparatus illustrated in FIG. 1 within the wireless base station via an antenna, and executes given wireless reception processes (such as A/D conversion and the like) for the received signal.

The demodulation unit 202 demodulates a received packet from each communication channel, which configures the received signal, and outputs the demodulated packet to the HARQ method switching unit 204.

The retransmission buffer unit 203 temporarily holds the received packet in preparation for synthesis with a retransmission packet to be received in the future. Then, the retransmission buffer unit 203 outputs a previously received packet corresponding to a retransmission portion included in the received packet when the received packet is input to the retransmission portion synthesis unit 205-3, 207-4 or the packet synthesis unit 207-1.

Figure 11:
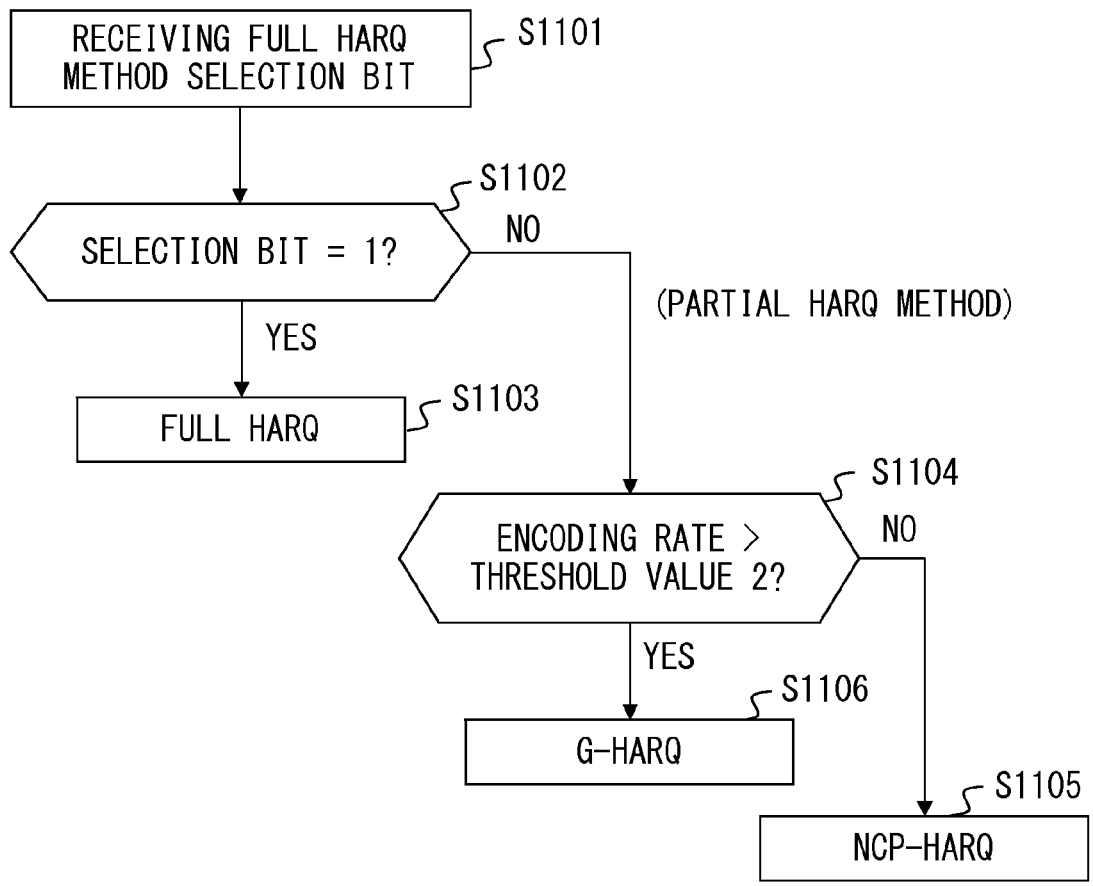
FIG. 11 is an operational flowchart illustrating an HARQ switching process executed by a control channel transmission/reception unit in a downlink side reception apparatus and an uplink side transmission apparatus.

The control channel transmission/reception unit 111 receives the full HARQ method selection bit (see FIG. 4B) that is periodically notified with a particular bit within the high-layer control channel from the control channel transmission/reception unit 111 within the transmission apparatus of FIG. 1 inside the wireless base station (step S101 of FIG. 11). The full HARQ method selection bit indicates that the full HARQ method is selected in the transmission apparatus of FIG. 1 within the wireless base station if its value is 1, or indicates that the partial HARQ method is selected if its value is 0.

Next, the control channel transmission/reception unit 111 determines whether or not the value of the received full HARQ method selection bit is 1 (step S1102 of FIG. 11).

If the value of the received full HARQ method selection bit is 1, the control channel transmission/reception unit 111 controls the HARQ method switching unit 204 to operate the full HARQ decoding unit 205 (step S1103 of FIG. 11).

As described above, when encoding is performed with the full HARQ encoding method in the transmission apparatus, a new packet and a retransmission packet are assigned to individual communication channels and individually transmitted.

Accordingly, when the full HARQ decoding unit 205 is operated, a received packet output from the demodulation unit 202 is input to the channel separation unit 205-1 within the full HARQ decoding unit 205 via the HARQ method switching unit 204.

The channel separation unit 205-1 respectively distributes the new packet (normal packet) and the retransmission packet to the decoding unit 205-2 and the retransmission portion synthesis unit 205-3 by identifying the communication channels. The control channel transmission/reception unit 111 receives, from the transmission apparatus, identification information indicating whether or not each of the communication channels is used as a channel of the retransmission packet by using, for example, the L1 control channel, and notifies the channel separation unit 205-1 of the identification information. The channel separation unit 205-1 distributes the new packet and the retransmission packet based on the identification information.

Next, the decoding unit 205-2 decodes the new packet input from the channel separation unit 205-1, and outputs resultant new information bits to the processing unit, not particularly illustrated, at the later stage. The decoding unit 205-2 calculates an error rate from the decoding result. For example, if the calculated error rate reaches a given threshold value or higher, the decoding unit 205-2 notifies the control channel transmission/reception unit 111 that the new portion needs to be retransmitted without outputting the decoded information bits.

If the full HARQ encoding based on the CC method is performed in the transmission apparatus, the retransmission portion synthesis unit 205-3 synthesizes a previously received packet that was unsuccessfully received for the first time and held in the retransmission buffer unit 203 with the retransmission packet input from the channel separation unit 205-1, and outputs the synthesized result to the decoding unit 205-4 as described with reference to FIG. 8A. In contrast, if the full HARQ encoding based on the IR method is performed in the transmission apparatus, the retransmission portion synthesis unit 205-3 synthesizes the previously received packet that was unsuccessfully received for the first time and held in the retransmission buffer unit 203 with incrementally retransmitted redundant information included in the retransmission packet, and outputs the synthesized result to the decoding unit 205-4 as illustrated in FIG. 8B. The control channel transmission/reception unit 111 receives, from the transmission apparatus, retransmission sequence information and other control information of the full HARQ method by using, for example, the L1 control channel, and notifies the retransmission portion synthesis unit 205-3 of the control information. The retransmission portion synthesis unit 205-3 synthesizes the retransmission packet based on the control information.

The decoding unit 205-4 decodes the packet synthesized with the retransmission, and outputs the resultant decoded information bits to the processing unit, not particularly illustrated, at the later stage. The decoding unit 205-4 calculates an error rate from the decoding result. For example, if the calculated error rate reaches a given threshold value or higher, the decoding unit 205-4 notifies the control channel transmission/reception unit 111 that a retransmission is needed without outputting the decoded information bits.

Next, if determining that the value of the full HARQ method selection bit is not 1 in step S1102 of FIG. 11, the control channel transmission/reception unit 111 of the reception apparatus of FIG. 2 further determines whether or not the encoding rate of the currently selected encoding method is higher than the given threshold value (=threshold value 2) (step S1104 of FIG. 11). This encoding rate may be determined from MCS currently applied to a communication of the corresponding communication channel, for example, based on MCS level information that is periodically received from the wireless base station by using the L1 control channel.

If the encoding rate is equal to or lower than the threshold value 2, the control channel transmission/reception unit 111 controls the HARQ method switching unit 204 to operate the NCP-HARQ encoding unit 206 (step S1105 of FIG. 11).

As described above, when encoding is performed with the NCP-HARQ encoding method in the transmission apparatus, a new packet and a retransmission packet are assigned to one communication channel and transmitted as one piece by puncturing the retransmission packet in a parity bit part of the new packet.

Accordingly, when the NCP-HARQ decoding unit 206 is operated, a reception packet output from the demodulation unit 202 is input to the packet separation unit 206-1 within the NCP-HARQ decoding unit 206 via the HARQ method switching unit 204.

The packet separation unit 206-1 separates the new packet and the retransmission packet from the packet received as one piece from one communication channel, and respectively distributes the separated packets to the decoding unit 205-2 and the retransmission portion synthesis unit 205-3. The control channel transmission/reception unit 111 receives, from the transmission apparatus, control information about a puncture position and the like by using, for example, the L1 control channel, and notifies the packet separation unit 206-1 of the control information. The packet separation unit 206-1 distributes the new packet and the retransmission packet based on the control information.

Next, operations of the decoding unit 205-2 for decoding a new packet, operations of the retransmission portion synthesis unit 205-3 and the decoding unit 205-4 for restoring a previously received packet from a retransmission packet are performed identically to those in the case of the full HARQ decoding unit 205.

Then, if determining that the encoding rate is higher than the threshold value 2 in the determination of step S1104 of FIG. 11, the control channel transmission/reception unit 111 controls the HARQ method switching unit 204 to operate the G-HARQ encoding unit 207 (step S1106 of FIG. 11).

As described above, if encoding is performed with the G-HARQ encoding method in the transmission apparatus, a new packet and a retransmission packet are assigned to one communication channel and transmitted as one piece by puncturing the retransmission packet in an information bit part of the new packet.

Accordingly, when the G-HARQ decoding unit 207 is operated, the received packet output from the demodulation unit 202 is input to the packet synthesis unit 207-1 and the retransmission portion synthesis unit 207-4 within the G-HARQ decoding unit 207 via the HARQ method switching unit 204.

The packet synthesis unit 207-1 synthesizes the retransmission portion included in the received packet with a portion of a previously received packet output from the retransmission buffer unit 203. For this control, the packet synthesis unit 207-1 references a control signal for the G-HARQ method, which is received by the control channel transmission/reception unit 111 from the transmission apparatus side, for example, via the L1 control channel.

Specifically, the packet synthesis unit 207-1 references the control signal to determine whether or not the received packet is a packet including the retransmission portion.

If determining that the received packet is not the packet including the retransmission portion, the packet synthesis unit 207-1 outputs the received packet to the decoding unit 207-2.

In contrast, if determining that the received packet is the packet including the retransmission portion, the packet synthesis unit 207-1 synthesizes the received packet with a portion of the previously received packet output from the retransmission buffer unit 203 or information bits output from the output switching unit 207-6.

Specifically, the packet synthesis unit 207-1 obtains, from the retransmission buffer unit 203, the portion of the previously received packet, which corresponds to the retransmission portion included in the received packet, at the initial decoding, and synthesizes the received packet with the obtained portion. As a result, the packet synthesis unit 207-1 generates a synthesis packet obtained by synthesizing the retransmission portion included in the received packet with the information of the previously received packet.

There may be cases where even though one reception packet including a new portion and a retransmission portion is unsuccessfully decoded at the initial decoding when a plurality of packets are sequentially received at one time, the packet synthesis unit 207-1 again synthesizes the unsuccessfully decoded reception packet with successfully decoded information bits of a retransmission portion of another reception packet, leading to successful decoding of the one reception packet.

Therefore, the packet synthesis unit 207-1 synthesizes the received packet with the decoding result of the retransmission portion of the received packet, which is output from the output switching unit 207-6, at the second or subsequent decoding. At this time, the decoding result of the retransmission portion synthesized with the received packet at the second or subsequent decoding has higher accuracy than the information of the previously received packet synthesized at the preceding decoding or the decoding result of the retransmission portion. Therefore, the newly synthesized packet is decoded with higher accuracy.

The packet synthesis unit 207-1 outputs the synthesis packets generated at the first decoding and the second or subsequent decoding to the decoding unit 207-2.

The decoding unit 207-2 decodes the received packet or the synthesized packet output from the packet synthesis unit 207-1.

Namely, if the received packet is output from the packet synthesis unit 207-1, the decoding unit 207-2 decodes the received packet by using a redundant data portion of the received packet. Since this received packet does not include a retransmission portion, the decoding result includes only information bits of the new portion.

Additionally, if the synthesized packet is output from the packet synthesis unit 207-1, the decoding unit 207-2 decodes the synthesized packet by using not only a redundant data portion of the received packet but a decoding result of a portion of a previously received packet or a retransmission portion of another received packet. Then, the decoding unit 207-2 outputs the decoding result corresponding to the new portion of the received packet to the output switching unit 207-3. The decoding unit 207-2 decodes the synthesized packet by using the portion of the previously received packet and the decoding result of the retransmission portion of another received packet. Therefore, a decoding result with higher accuracy than that acquired by decoding only the received packet may be obtained.

The output switching unit 207-3 calculates an error rate from the decoding result of the decoding unit 207-2. If the calculated error rate is equal to or higher than a given threshold value and the number of repetitions of decoding is smaller than a given number, the output switching unit 207-3 outputs the decoding result of the new portion only to the retransmission portion synthesis unit 207-4. In contrast, if the error rate is lower than the given threshold value, the output switching unit 207-3 outputs the decoding result of the new portion to the retransmission portion synthesis unit 207-4, and outputs the decoding result as information bits of the new block to the processing unit, not particularly illustrated, at the later stage. If the error rate is equal to or higher than the given threshold value and the number of repetitions of decoding reaches the given number, the output switching unit 207-3 outputs the decoding result of the new portion to the retransmission portion synthesis unit 207-4 and notifies the control channel transmission/reception unit 111 that the new portion needs to be retransmitted.

Next, the retransmission portion synthesis unit 207-4 extracts the retransmission portion included in the received packet by using the decoding result of the new portion of the received packet, and synthesizes the previously received packet with the extracted retransmission portion. For this control, the packet synthesis unit 207-1 references a control signal for the G-HARQ method, which is received by the control channel transmission/reception unit 111 from the transmission apparatus side, for example, via the L1 control channel.

Specifically, the retransmission portion synthesis unit 207-4 determines whether or not the received packet is a packet including the retransmission portion.

If determining that the received packet is the packet including the retransmission portion, the retransmission portion synthesis unit 207-4 extracts the retransmission portion from the received packet by using the decoding result of the new portion, which is output from the output switching unit 207-3. Then, the retransmission portion synthesis unit 207-4 obtains the previously received packet corresponding to the extracted retransmission portion from the retransmission buffer unit 203, and synthesizes the previously received packet with the extracted retransmission portion. As a result, the retransmission portion synthesis unit 207-4 generates a synthesis packet obtained by synthesizing the previously received packet with the retransmission portion of the newly received packet.

The newly received packet sometimes includes retransmission portions of a plurality of previously received packets. Therefore, in such a case, the retransmission portion synthesis unit 207-4 respectively synthesizes the previously received packets with corresponding retransmission portions.

The retransmission portion synthesis unit 207-4 sometimes receives a plurality of packets at one time in a similar manner as in the case of the packet synthesis unit 207-1. Even though a retransmission portion of one received packet including a new portion and the retransmission portion is unsuccessfully decoded with the first decoding process, the retransmission portion may be successfully decoded in some cases by again synthesizing the unsuccessfully decoded packet with successfully decoded information bits of a new portion of another received packet.

Accordingly, the retransmission portion synthesis unit 207-4 repeatedly extracts a retransmission portion from a newly received packet each time the decoding result of a new portion is output from the output switching unit 207-3, and generates a synthesis packet obtained by synthesizing a previously received packet with a more accurate retransmission portion than that at the time of preceding decoding. A retransmission portion extracted at the second or subsequent decoding is extracted by using the decoding result of the new portion with higher accuracy than that at the preceding decoding. Therefore, the retransmission portion has a higher accuracy than that extracted at the preceding decoding.

The decoding unit 207-5 decodes the synthesized packet output from the retransmission portion synthesis unit 207-4. Namely, the decoding unit 207-5 decodes the synthesis packet by using the previously received packet having an error and the retransmission portion of the received packet. Then, the decoding unit 207-5 outputs the decoding result of the synthesis packet to the output switching unit 207-6. The decoding unit 207-5 performs decoding by using information of the accurate retransmission portion extracted by using the decoding result of the new portion. Therefore, a decoding result with higher accuracy than that in the case of decoding performed by simply synthesizing a previously received packet with the retransmission portion of a received packet may be obtained.

The output switching unit 207-6 calculates an error rate from the decoding result of the decoding unit 207-5. If the calculated error rate is equal to or higher than a given threshold value and the number of repetitions of the decoding is smaller than a given number, a decoding result corresponding to the retransmission portion within the synthesis packet is output only to the packet synthesis unit 207-1. In contrast, if the error rate is lower than the given threshold value, the output switching unit 207-6 outputs the decoding result of the synthesis packet to the processing unit, not particularly illustrated, at the later stage. Alternatively, if the error rate is equal to or higher than the given threshold value and the number of repetitions of the decoding reaches the given number, the output switching unit 207-6 notifies the control channel transmission/reception unit 111 that a block corresponding to the retransmission portion needs to be further retransmitted.

The control channel transmission/reception unit 111 receives, from the transmission apparatus, a control signal indicating whether or not the packet includes a retransmission portion, for example, via the L1 control channel. Moreover, the control channel transmission/reception unit 111 transmits ACK/NAK to the transmission apparatus of FIG. 1 depending on the notification, made from the output switching unit 207-3 and the output switching unit 207-6, of whether or not a retransmission is needed.

An example of operations of the G-HARQ decoding unit 207 having the above described configuration is further described with reference to FIG. 12. Here, assume that two packets 1 and 2 are transmitted from the transmission apparatus to the reception apparatus and the packets are unsuccessfully received by the reception apparatus, which then returns NAK as illustrated as step 1 of FIG. 12. Further assume that two retransmission packets 1 and 2 are transmitted, the retransmission packet 1 is unsuccessfully received and NAK is returned, and the retransmission packet 2 is successfully received and ACK is returned.

In this case, in step 2 of FIG. 12, the packet synthesis unit 207-1 respectively synthesizes the retransmission packet 1 with the received packets 1 and 2 held in the retransmission buffer unit 203, and the decoding unit 207-2 attempts to respectively decode the synthesized packets. However, the decoding unit 207-2 unsuccessfully decodes the packets. As a result, the control channel transmission/reception unit 111 returns NAK corresponding to a new portion within the retransmission packet 1 to the transmission apparatus, for example, via the L1 control channel based on a notification from the output switching unit 207-3.

In the meantime, the packet synthesis unit 207-1 respectively synthesizes the retransmission packet 2 with the received packets 1 and 2 held in the retransmission buffer unit 203, and the decoding unit 207-2 attempts to respectively decode the synthesized packets. As a result, the decoding unit 207-2 successfully decodes a new portion (white portion) within the retransmission packet 2, and the output switching unit 207-3 obtains the new portion. Consequently, information bits of the new portion are output from the output switching unit 207-3 to the processing unit at the later stage, and also output to the retransmission portion synthesis unit 207-4. Moreover, ACK corresponding to the new portion within the retransmission packet 2 is returned from the control channel transmission/reception unit 111 to the transmission apparatus, for example, via the L1 control channel based on a notification from the output switching unit 207-3.

Next, in step 2 of FIG. 12, the retransmission portion synthesis unit 207-4 respectively synthesizes the retransmission packet 1 with the received packets 1 and 2 held in the retransmission buffer unit 203, and the decoding unit 207-5 attempts to respectively decode the synthesized packets. However, the decoding unit 207-5 unsuccessfully decodes the packets.

In the meantime, the retransmission portion synthesis unit 207-4 also synthesizes the retransmission packet 2 respectively with the received packets 1 and 2 held in the retransmission buffer 203, and with the new portion of the retransmission packet 2 input from the output switching unit 207-3. Then, the decoding unit 207-5 attempts to respectively decode the synthesized packets. As a result, the synthesized packet 1 including the retransmission portion of the retransmission packet 2 is successfully decoded, and the synthesized packet 2 including the retransmission portion of the retransmission packet 2 is unsuccessfully decoded, and the output switching unit 207-6 obtains information bits of the packet 1. Consequently, the information bits of the packet 1 restored with the retransmission are output from the output switching unit 207-6 to the processing unit at the later stage, and also output to the packet synthesis unit 207-1. Moreover, ACKs respectively corresponding to the packet 1 and the retransmission packet 2 are returned from the control channel transmission/reception unit 111 to the transmission apparatus, for example, via the L1 control channel based on a notification from the output switching unit 207-6.

Then, in step 3 of FIG. 12, the packet synthesis unit 207-1 respectively synthesizes the retransmission packet unsuccessfully decoded at the first decoding with the received packets 1 and 2 held in the retransmission buffer unit 203, and with the information bits of the packet 1 input from the output switching unit 207-6. Then, the decoding unit 207-2 attempts to respectively decode the synthesized packets for the second time. As a result, a new portion (white portion) within the retransmission packet 1 is successfully decoded, and the new portion is obtained by the output switching unit 207-3. Consequently, information bits of the new portion are output from the output switching unit 207-3 to the processing unit at the later stage, and also output to the retransmission portion synthesis unit 207-4. Moreover, ACK corresponding to the new portion within the retransmission packet 1 is returned from the control channel transmission/reception unit 111 to the transmission apparatus, for example, via the L1 control channel based on a notification from the output switching unit 207-3.

Next, in step 4 of FIG. 12, the retransmission portion synthesis unit 207-4 synthesizes the retransmission packet 1 with the received packet 2 left in the retransmission buffer unit 203, and with the new portion of the retransmission packet 1 input from the output switching unit 207-3. Then, the decoding unit 207-5 attempts to respectively decode the synthesized packets. As a result, the synthesized packet 2 including the retransmission portion of the retransmission packet 1 is successfully decoded, and information bits of the packet 2 are obtained by the output switching unit 207-6. Consequently, the information bits of the packet 2 restored with the retransmission are output from the output switching unit 207-6 to the processing unit at the later stage, and also output to the packet synthesis unit 207-1. Moreover, ACKs respectively corresponding to the packet 2 and the retransmission packet 1 are returned from the control channel transmission/reception unit 111 to the transmission apparatus, for example, via the L1 control channel based on a notification from the output switching unit 207-6.

By repeating the decoding process by a plurality of times by using other decoding results based on a retransmission as described above, the decoding may be performed successfully.

As described above, one example of the control operations for selecting an HARQ method, which are performed by the control channel transmission/reception unit 111, respectively in the case of installing the transmission apparatus of FIG. 1, for example, in the wireless base station, and in the case of installing the reception apparatus of FIG. 2, for example, in the wireless mobile terminal has been described with reference to the operational flowcharts of FIGS. 7 and 11. This is the case based on the assumption of a communication of a downlink system from the wireless base station toward the wireless mobile terminal.

Also the reverse case of installing the transmission apparatus of FIG. 1 and the reception apparatus of FIG. 2, for example, respectively in the wireless mobile terminal and the wireless base station may be implemented in a similar manner as in the above described case. This is the case based on the assumption of a communication of an uplink system from the wireless mobile terminal toward the wireless base station.

In this case, for example, in the wireless base station, the control channel transmission/reception unit 111 within the reception apparatus of FIG. 2 may be made common to the control channel transmission/reception unit 111 within the transmission apparatus of FIG. 1 inside the same wireless base station. Accordingly, control operations for selecting an HARQ method for the reception apparatus are performed as operations identical to the control operations for selecting an HARQ method, which are performed by the control channel transmission/reception unit 111 for the transmission apparatus of FIG. 1 in the wireless base station and represented by the operational flowchart of FIG. 7.

On the contrary, for example, in the wireless mobile terminal, the control channel transmission/reception unit 111 within the transmission apparatus of FIG. 1 may be made common to the control channel transmission/reception unit 111 within the reception apparatus of FIG. 2 inside the same wireless mobile terminal. Accordingly, control operations for selecting an HARQ method for the transmission apparatus are performed as operations identical to the control operations for selecting an HARQ method, which are performed by the control channel transmission/reception unit 111 for the reception apparatus of FIG. 2 in the wireless mobile terminal and represented with the operational flowchart of FIG. 11.

As described above, this embodiment has been described by taking, as an example, the case of adopting, for example, an E-UTRA communication system as a packet transmission/reception system. However, this embodiment is naturally applicable to packet transmission/reception systems other than a wireless communication system.

According to the embodiments discussed herein, the transmission apparatus, reception apparatus, communication system and communication method using adaptive HARQ method may be design to work appropriately in all channel circumstances.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiments have been described in detail, it should be understood that the various changes, substitutions, and alterations could be made hereto without departing from the spirit and scope of the invention.

What is claimed is:

1. A transmission apparatus comprising:
   a first encoding unit configured to generate a new packet from a new portion obtained from a block which is generated from information bits, to generate a retransmission packet from a retransmission portion obtained from a block which is generated from information bits and is held for a retransmission, and to assign the new packet and the retransmission packet to a communication channel respectively;
   a second encoding unit configured to assign, to a communication channel, a packet obtained by mixing the new portion and the retransmission portion;
   a encoding method switching unit configured to switch between operations of the first encoding unit and the second encoding unit, so that communication channel data output from the first encoding unit or the second encoding unit is transmitted; and
   a transmission control unit configured to control the encoding method switching unit based on information indicating a communication quality of the communication channel in a reception apparatus, wherein:
   the second encoding unit comprises
      a third encoding unit configured to generate a new packet from the new portion, to assign the new packet to a communication channel, to insert information bits of the retransmission portion in a portion of bit positions to which a parity bit part of the new packet is to be assigned by delaying assignment of the new packet to the portion of the bit positions in the communication channel, and to output resultant communication channel data, and
      a fourth encoding unit configured to generate a packet by configuring an information bit part with mixing of the new portion and the retransmission portion in order to reduce the assignment of the new portion, to assign the packet to a communication channel, and to output resultant communication channel data;
   the encoding method switching unit switches among operations of the first encoding unit, the third encoding unit and the fourth encoding unit; and
   the transmission control unit calculates an encoding rate indicating efficiency of encoding in the communication channel, makes the encoding method switching unit select the fourth encoding unit if the encoding rate is higher than a given threshold value, and otherwise makes the encoding method switching unit select the third encoding unit when selecting the second encoding unit.

2. The transmission apparatus according to claim 1, further comprising:
   a controller configured to control a retransmission of a packet in order to make the reception apparatus decode the unsuccessfully decoded packet by combining an unsuccessfully decoded packet with a retransmitted packet without discarding the unsuccessfully decoded packet based on acknowledgement information returned from the reception apparatus;
   a block generation unit configured to generate the block of a given size from the information bits to be transmitted;
   a retransmission buffer unit configured to hold the block for the retransmission;
   a new portion obtainment unit configured to obtain the new portion to be transmitted from the block generated by the block generation unit;
   a retransmission portion obtainment unit configured to obtain the retransmission portion to be transmitted from the block held in the retransmission buffer unit for the retransmission;
   a modulation unit configured to modulate the communication channel data output from the first encoding unit or the second encoding unit; and
   a transmission processing unit configured to transmit an output of the modulation unit.

3. The transmission apparatus according to claim 1, wherein
   the transmission control unit periodically receives, from the reception apparatus, a channel quality indicator indicating a communication quality of the communication channel as information indicating the communication quality of the communication channel in the reception apparatus,
   the transmission control unit controls a modulation code scheme of a communication performed in the communication channel based on the channel quality indicator, and
   the transmission control unit calculates an error between a communication quality corresponding to a modulation code scheme of a communication currently being performed for the communication channel and the communication quality indicated by the channel quality indicator, which is currently notified from the reception apparatus and corresponds to the communication channel, makes the encoding method switching unit select the first encoding unit if the error is larger than a given threshold value, and otherwise makes the encoding method switching unit select the second encoding unit.

4. The transmission apparatus according to claim 1, wherein the transmission control unit periodically receives, from the reception apparatus, moving speed information indicating a moving speed of a mobile terminal device including the reception apparatus as the information indicating the communication quality of the communication channel in the reception apparatus, makes the encoding method switching unit select the first encoding unit if the moving speed information is larger than a given threshold value, and otherwise makes the encoding method switching unit select the second encoding unit.

5. The transmission apparatus according to claim 1, wherein the transmission control unit notifies, with a control channel corresponding to the communication channel, the reception apparatus of first selection information indicating which of the first encoding unit and the second encoding unit the encoding method switching unit is made to select.

6. The transmission apparatus according to claim 1, wherein the transmission control unit notifies, with a control channel corresponding to the communication channel, the reception apparatus of second selection information indicating which of the third encoding unit and the fourth encoding unit the encoding method switching unit is made to select.

7. A reception apparatus comprising:
  a first decoding unit configured to distribute a reception packet as a new packet storing a new portion and a retransmission packet storing a retransmission portion by identifying a communication channel of the reception packet, to extract and output information bits of the new portion from the new packet, to restore the reception packet by extracting information bits of the retransmission portion from the retransmission packet and by synthesizing a received packet held for synthesis with the retransmission portion with the extracted information bits of the retransmission portion, and to extract and output information bits of the restored reception packet;
  a second decoding unit configured to respectively extract the new portion and the retransmission portion from the reception packet, to extract and output the information bits of the new portion, to restore the reception packet by extracting the information bits of the retransmission portion and by synthesizing the received packet held for synthesis with the retransmission portion with the extracted information bits of the retransmission portion, and to extract and output information bits from the restored reception packet;
  a decoding method switching unit configured to switch between operations of the first decoding unit and the second decoding unit; and
  a reception control unit configured to control the decoding method switching unit based on information indicating a communication quality of the communication channel.

8. The reception apparatus according to claim 7, further comprising:
  a controller configured to control a retransmission of a packet while decoding the reception packet by combining the reception packet with the reception packet retransmitted from the transmission apparatus without discarding an unsuccessfully decoded reception packet while returning, to the transmission apparatus, acknowledgement information indicating whether or not a reception packet is successfully received;
  a reception processing unit configured to receive the reception signal;
  a demodulation unit configured to demodulate the reception packet from a communication channel configuring the reception signal; and
  a retransmission buffer unit configured to hold the reception packet for synthesis with the retransmission portion.

9. The reception apparatus according to claim 7, wherein the reception control unit receives, from the transmission apparatus, first selection information instructing which of the first decoding unit and the second decoding unit is to be selected as information indicating the communication quality of the communication channel by using a control channel corresponding to the communication channel, and
the reception control unit controls the decoding method switching unit based on the first selection information.

10. The reception apparatus according to claim 7, wherein:
the second decoding unit comprises a third decoding unit configured to separate a new packet storing a new portion and a retransmission packet storing a retransmission portion from the reception packet, to extract and output information bits of the new portion from the new packet, to restore the reception packet by extracting information bits of the retransmission portion from the retransmission packet and by synthesizing the unsuccessfully received packet held in the retransmission buffer unit with the extracted information bits, and to extract and output information bits from the reception packet, and
  a fourth decoding unit configured to separate the new portion and the retransmission portion from the information bits of the reception packet while synthesizing with the unsuccessfully received packet held in the retransmission buffer unit or a precedingly extracted new portion or retransmission portion, to extract and output the information bits of the new portion, to restore the reception packet by extracting the information bits of the retransmission portion and by synthesizing the unsuccessfully received packet held in the retransmission buffer unit or the precedingly extracted new portion or retransmission portion with the extracted information bits, and to extract and output information bits from the reception packet;
the decoding method switching unit switches among operations of the first decoding unit, the third decoding unit and the fourth decoding unit; and
the reception control unit obtains an encoding rate indicating efficiency of encoding in the communication channel, makes the decoding method switching unit select the fourth decoding unit if the encoding rate is higher than a given threshold value, and otherwise makes the decoding method switching unit select the third decoding unit when the second encoding unit is selected.

11. The reception apparatus according to claim 10, wherein the reception control unit receives, from the transmission apparatus, second selection information instructing which of the third decoding unit and the fourth decoding unit is to be selected as the encoding rate indicating efficiency of encoding in the communication channel by using a control channel corresponding to the communication channel, and
controls the decoding method switching unit based on the second selection information.

12. The reception apparatus according to claim 7, wherein the reception control unit calculates and obtains the encoding rate indicating efficiency of encoding in the communication channel from a modulation code scheme of a communication currently being performed for the communication channel.

13. A communication system comprising:
a transmission apparatus comprises:
  a first encoding unit configured to generate a new packet from a new portion obtained from a block which is generated from information bits, to generate a retransmission packet from a retransmission portion obtained from a block which is generated from information bits and is held for a retransmission, and to assign the new packet and the retransmission packet to a communication channel respectively;
  a second encoding unit configured to assign, to a communication channel, a packet obtained by mixing the new portion and the retransmission portion;
  a encoding method switching unit configured to switch between operations of the first encoding unit and the second encoding unit, so that communication channel data output from the first encoding unit or the second encoding unit is transmitted; and a transmission control unit configured to control the encoding method switching unit based on information indicating a communication quality of the communication channel in a reception apparatus; and the reception apparatus comprises:

a first decoding unit configured to distribute a reception packet as a new packet storing a new portion and a retransmission packet storing a retransmission portion by identifying a communication channel of the reception packet, to extract and output information bits of the new portion from the new packet, to restore the reception packet by extracting information bits of the retransmission portion from the retransmission packet and by synthesizing a received packet held for synthesis with the retransmission portion with the extracted information bits of the retransmission portion, and to extract and output information bits of the restored reception packet;

a second decoding unit configured to respectively extract the new portion and the retransmission portion from the reception packet, to extract and output the information bits of the new portion, to restore the reception packet by extracting the information bits of the retransmission portion and by synthesizing the received packet held for synthesis with the retransmission portion with the extracted information bits of the retransmission portion, and to extract and output information bits from the restored reception packet;

a decoding method switching unit configured to switch between operations of the first decoding unit and the second decoding unit; and a reception control unit configured to control the decoding method switching unit based on information indicating a communication quality of the communication channel.

14. The communication system according to claim 13, wherein the transmission apparatus further comprises:

a controller configured to control a retransmission of a packet in order to make the reception apparatus decode the unsuccessfully decoded packet by combining an unsuccessfully decoded packet with a retransmitted packet without discarding the unsuccessfully decoded packet based on acknowledgement information returned from the reception apparatus;

a block generation unit configured to generate the block of a given size from the information bits to be transmitted;

a retransmission buffer unit configured to hold the block for the retransmission;

a new portion obtainment unit configured to obtain the new portion to be transmitted from the block generated by the block generation unit;

a retransmission portion obtainment unit configured to obtain the retransmission portion to be transmitted from the block held in the retransmission buffer unit for the retransmission;

a modulation unit configured to modulate the communication channel data output from the first encoding unit or the second encoding unit; and a transmission processing unit configured to transmit an output of the modulation unit, and the reception apparatus further comprises:

a controller configured to control a retransmission of a packet while decoding the reception packet by combining the reception packet with the reception packet retransmitted from the transmission apparatus without discarding an unsuccessfully decoded reception packet while returning, to the transmission apparatus, acknowledgement information indicating whether or not a reception packet is successfully received;

a reception processing unit configured to receive the reception signal;

a demodulation unit configured to demodulate the reception packet from a communication channel configuring the reception signal; and a retransmission buffer unit configured to hold the reception packet for synthesis with the retransmission portion.

15. The communication system according to claim 13, wherein the second encoding unit comprises:

a third encoding unit configured to generate a new packet from the new portion, to assign the new packet to a communication channel, to insert the information bits of the retransmission portion in a portion of bit positions to which a parity bit part of the new packet is to be assigned by delaying assignment of the new packet to the portion of the bit positions in the communication channel, and to output resultant communication channel data, and a fourth encoding unit configured to generate a packet by configuring an information bit part with mixing of the new portion and the retransmission portion in order to reduce the assignment of the new portion, to assign the packet to a communication channel, and to output resultant communication channel data;

the encoding method switching unit switches among operations of the first encoding unit, the third encoding unit and the fourth encoding unit;

the transmission control unit calculates an encoding rate indicating efficiency of encoding in the communication channel, makes the encoding method switching unit select the fourth encoding unit if the encoding rate is higher than a given threshold value, and otherwise makes the encoding method switching unit select the third encoding unit when selecting the second encoding unit;

the second decoding unit comprises a third decoding unit configured to separate a new packet storing a new portion and a retransmission packet storing a retransmission portion from the reception packet, to extract and output information bits of the new portion from the new packet, to restore the reception packet by extracting the information bits of the retransmission portion from the retransmission packet and by synthesizing the received packet held for synthesis with the retransmission portion with the extracted information bits, and to extract and output the information bits from the restored reception packet, and a fourth decoding unit configured to separate the new portion and the retransmission portion from the information bits of the reception packet while synthesizing with the unsuccessfully received packet held in the retransmission buffer unit or a precedingly extracted new portion or retransmission portion, to extract and output the information bits of the new portion, to restore the reception packet by extracting the information bits of the retransmission portion and by synthesizing the received packet held for synthesis with the retransmission portion or the precedingly extracted new portion or retransmission portion with the extracted information bits, and to extract and output information bits from the restored reception packet;

the decoding method switching unit switches among operations of the first decoding unit, the third decoding unit and the fourth decoding unit; and the reception control unit obtains an encoding rate indicating efficiency of encoding in the communication channel, makes the decoding method switching unit select the fourth decoding unit if the encoding rate is higher than a given threshold value, and otherwise makes the decoding method switching unit select the third decoding unit when the second encoding unit is selected.

16. A communication method comprising:
   at a transmission apparatus,
      first encoding to generate a new packet from a new portion obtained from a block which is generated from information bits, to generate a retransmission packet from a retransmission portion obtained from a block which is generated from information bits and is held for a retransmission, and to assign the new packet and the retransmission packet to a communication channel respectively;
      second encoding to assign, to a communication channel, a packet obtained by mixing the new portion and the retransmission portion;
      encoding method switching to switch between operations of the first encoding and the second encoding, so that communication channel data output from the first encoding or the second encoding is transmitted;
      transmission controlling to control the encoding method switching based on information indicating a communication quality of the communication channel in a reception apparatus;
   at the reception apparatus,
      first decoding to distribute a reception packet as a new packet storing a new portion and a retransmission packet storing a retransmission portion by identifying a communication channel of the reception packet, to extract and output information bits of the new portion from the new packet, to restore the reception packet by extracting information bits of the retransmission portion from the retransmission packet and by synthesizing a received packet held for synthesis with the retransmission portion with the extracted information bits of the retransmission portion, and to extract and output information bits from the restored reception packet;
      second decoding to respectively extract the new portion and the retransmission portion from the reception packet, to extract and output the information bits of the new portion, to restore the reception packet by extracting the information bits of the retransmission portion and by synthesizing the received packet held for synthesis with the retransmission portion with the extracted information bits of the retransmission portion, and to extract and output information bits from the restored reception packet;
      decoding method switching to switch between operations of the first decoding and the second decoding; and
      reception controlling to control the decoding method switching based on information indicating the communication quality of the communication channel.

17. The communication method according to claim 16, further comprising:
   controlling a retransmission of a reception packet while decoding the reception packet by combining the reception packet with a retransmitted reception packet without discarding an unsuccessfully decoded reception packet while communicating acknowledgement information;
   at a transmission apparatus,
   generating to generate the block of a given size from the information bits to be transmitted;
   buffering to temporarily hold the block of the information bits, which is generated by the block generation step, in preparation for a retransmission;
   obtaining to obtain a new portion to be transmitted from the block generated by the generating;
   obtaining to obtain a retransmission portion to be transmitted from the block for the retransmission, which is held in the buffering;
   modulating to modulate the communication channel data output from the first encoding or the second encoding; and
   transmission processing to transmit an output of the modulating; and at the reception apparatus,
   reception processing to receive the reception signal,
   demodulating to demodulate the reception packet from a communication channel configuring the reception signal,
   buffering to temporarily hold the reception packet for synthesis with the retransmission portion.

18. The communication method according to claim 16, wherein
   the second encoding comprises
      third encoding to generate a new packet from the new portion, to assign the new packet to a communication channel, to insert the information bits of the retransmission portion in a portion of bit positions to which a parity bit part of the new packet is to be assigned by delaying assignment of the new packet to the portion of the bit positions in the communication channel, and to output resultant communication channel data, and
      fourth encoding to generate a packet by configuring an information bit part with mixing of the new portion and the retransmission portion in order to reduce the assignment of the new portion, to assign the packet to a communication channel, and to output resultant communication channel data; wherein
   the encoding method switching switches among operations of the first encoding, the third encoding, and the fourth encoding;
   the transmission controlling calculates an encoding rate indicating efficiency of encoding in the communication channel, makes the encoding method switching select the fourth encoding if the encoding rate is higher than a given threshold value, and otherwise makes the encoding method switching select the third encoding when selecting the second encoding;
   the second decoding comprises
      third decoding to separate a new packet storing a new portion and a retransmission packet storing a retransmission portion from the reception packet, to extract and output information bits of the new portion from the new packet, to restore the reception packet by extracting information bits of the retransmission portion from the retransmission packet and by synthesizing the received packet held for synthesis with the retransmission portion with the extracted information bits, and to extract and output information bits from the restored reception packet, and fourth decoding to separate the new portion and the retransmission portion from the information bits of the reception packet while synthesizing with the unsuccessfully received packet held in the buffer or a precedingly extracted new portion or retransmission portion, to extract and output the information bits of the new portion, to restore the reception packet by extracting the information bits of the retransmission portion and by synthesizing the received packet held for synthesis with the retransmission portion or the precedingly extracted new portion or retransmission portion with the extracted information bits, and to extract and output information bits from the restored reception packet; wherein the decoding method switching switches among operations of the first decoding, the third decoding, and the fourth decoding; and the reception controlling obtains an encoding rate indicating efficiency of encoding in the communication channel, makes the decoding method switching select the fourth decoding if the encoding rate is higher than a given threshold value, and otherwise makes the decoding method switching select the third decoding when selecting the second decoding.

* * * * *